United States Patent
Kusukame et al.

(10) Patent No.: US 8,571,076 B2
(45) Date of Patent: Oct. 29, 2013

(54) LASER LIGHT SOURCE, IMAGE DISPLAY APPARATUS, AND PROCESSING APPARATUS

(75) Inventors: Koichi Kusukame, Osaka (JP); Hiroyuki Furuya, Osaka (JP); Kiminori Mizuuchi, Ehime (JP); Tomoya Sugita, Nara (JP); Akihiro Morikawa, Ehime (JP); Nobuyuki Horikawa, Osaka (JP); Kazuhisa Yamamoto, Osaka (JP); Shinichi Kadowaki, Hyogo (JP)

(73) Assignee: Panasonic Corporation, Osaka (JP)

(*) Notice: Subject to any disclaimer, the term of this patent is extended or adjusted under 35 U.S.C. 154(b) by 186 days.

(21) Appl. No.: 12/411,636

(22) Filed: Mar. 26, 2009

(65) Prior Publication Data

US 2009/0257463 A1 Oct. 15, 2009

(30) Foreign Application Priority Data

Mar. 28, 2008 (JP) ................. 2008-086053
Apr. 3, 2008 (JP) ................. 2008-096846
Jun. 11, 2008 (JP) ................. 2008-152588

(51) Int. Cl.
*H01S 3/10* (2006.01)

(52) U.S. Cl.
USPC ............... 372/21; 372/22; 359/328; 359/332

(58) Field of Classification Search
USPC ............... 372/21, 22; 359/328, 332
See application file for complete search history.

(56) References Cited

U.S. PATENT DOCUMENTS

| | | | | |
|---|---|---|---|---|
| 5,036,220 A | * | 7/1991 | Byer et al. ............... | 359/328 |
| 5,313,543 A | * | 5/1994 | Matsuda et al. ........... | 385/122 |
| 6,356,674 B1 | * | 3/2002 | Davis et al. .............. | 385/10 |
| 7,236,674 B2 | * | 6/2007 | Mizuuchi et al. ........... | 385/130 |
| 2005/0254531 A1 | | 11/2005 | Furukawa | |
| 2006/0257084 A1 | | 11/2006 | Mizuuchi | |
| 2007/0116068 A1 | * | 5/2007 | Mao ....................... | 372/10 |
| 2007/0153866 A1 | * | 7/2007 | Shchegrov et al. ......... | 372/50.124 |
| 2010/0165452 A1 | | 7/2010 | Furuya | |

FOREIGN PATENT DOCUMENTS

| | | |
|---|---|---|
| JP | 4-296731 | 10/1992 |
| JP | 4-340781 | 11/1992 |
| JP | 11-289131 | 10/1999 |
| JP | 2000-147584 | 5/2000 |
| JP | 2003-267798 | 9/2003 |
| JP | 2003-267799 | 9/2003 |
| JP | 2004-219845 | 8/2004 |
| JP | 2005-327823 | 11/2005 |
| JP | 3121920 | 5/2006 |
| JP | 2006-219339 | 8/2006 |
| WO | 2007/013513 | 2/2007 |

* cited by examiner

*Primary Examiner* — Tod T Van Roy
(74) *Attorney, Agent, or Firm* — Wenderoth, Lind & Ponack, L.L.P.

(57) ABSTRACT

A laser light source includes a fundamental laser generator that generates a fundamental laser light, a wavelength conversion element that is made of a ferroelectric crystal with a periodically poled structure and converts the fundamental laser light to a laser light having a different wavelength, a holding member that holds at least a part of an element surface of the wavelength conversion element that crosses a polarization direction of the periodically poled structure, and an insulation layer that is provided between the holding member and the element surface. Electric resistivity of the insulation layer is $1 \times 10^8$ Ω·cm or higher.

20 Claims, 18 Drawing Sheets

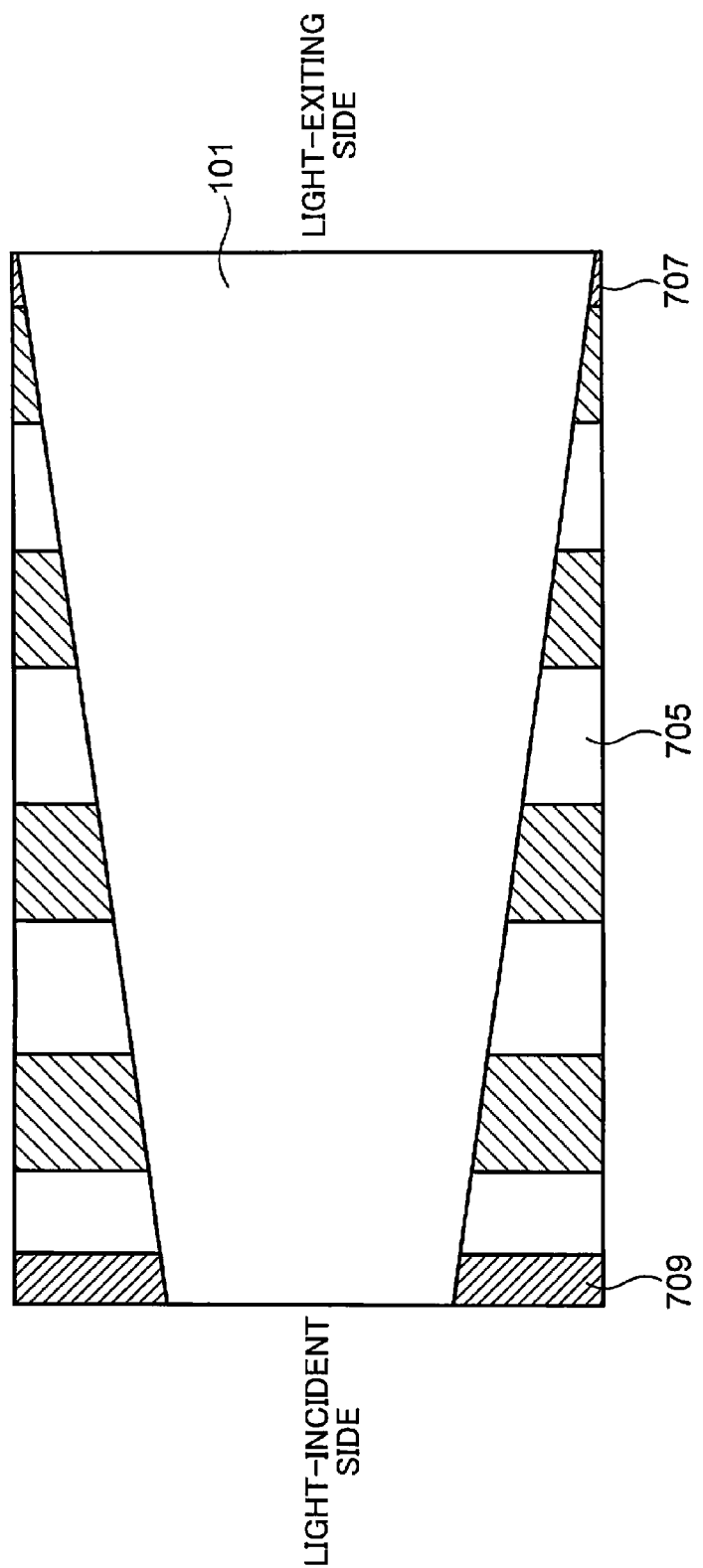

FIG. 2

| | INSULATION CONDITION EACH n = 10 | ELECTRIC RESISTIVITY ($\Omega \cdot cm$) | FUNDAMENTAL WAVE TRANSMITTANCE AFTER 1000 HOURS | DETERMINATION |
|---|---|---|---|---|
| 1 | CONDUCTIVE COATING MATERIAL | $5 \times 10^{-5}$ | 3.2% DROP | × |
| 2 | COATING MATERIAL A | $1 \times 10^{8}$ | 0.8% DROP | △ |
| 3 | COATING MATERIAL B | $2 \times 10^{11}$ | NO CHANGE | ○ |
| 4 | SiO$_2$ RF SPUTTERED FILM | — — | 2.4% DROP | △ |
| 5 | SiO$_2$ CVD FILM | — — | NO CHANGE | ○ |
| 6 | UNIT ELEMENT (FOR REFERENCE) | — — | NO CHANGE | ○ |

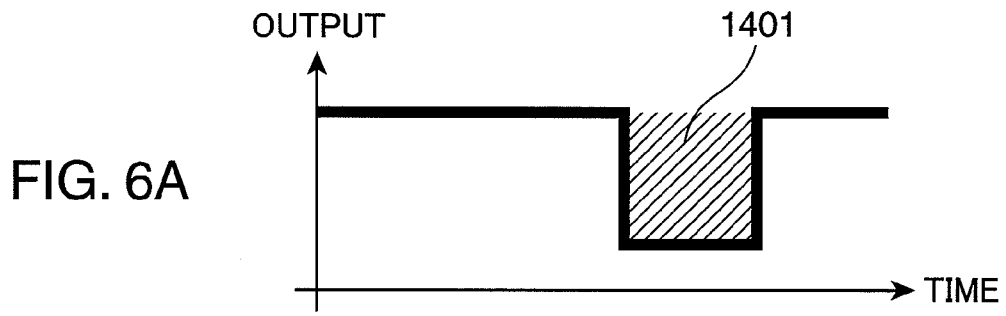
FIG. 6A
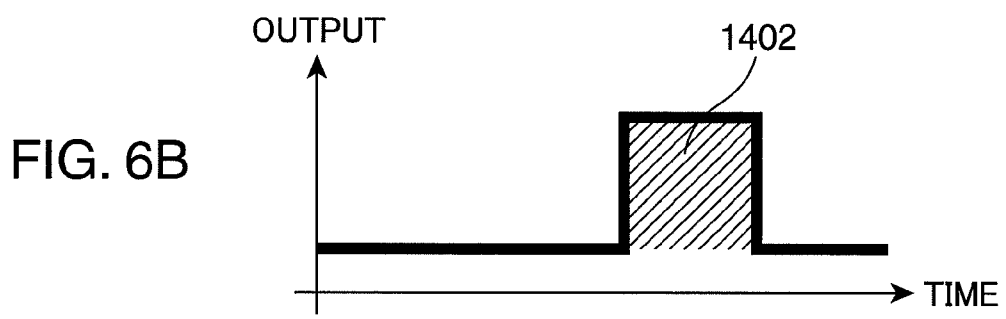
FIG. 6B
FIG. 7
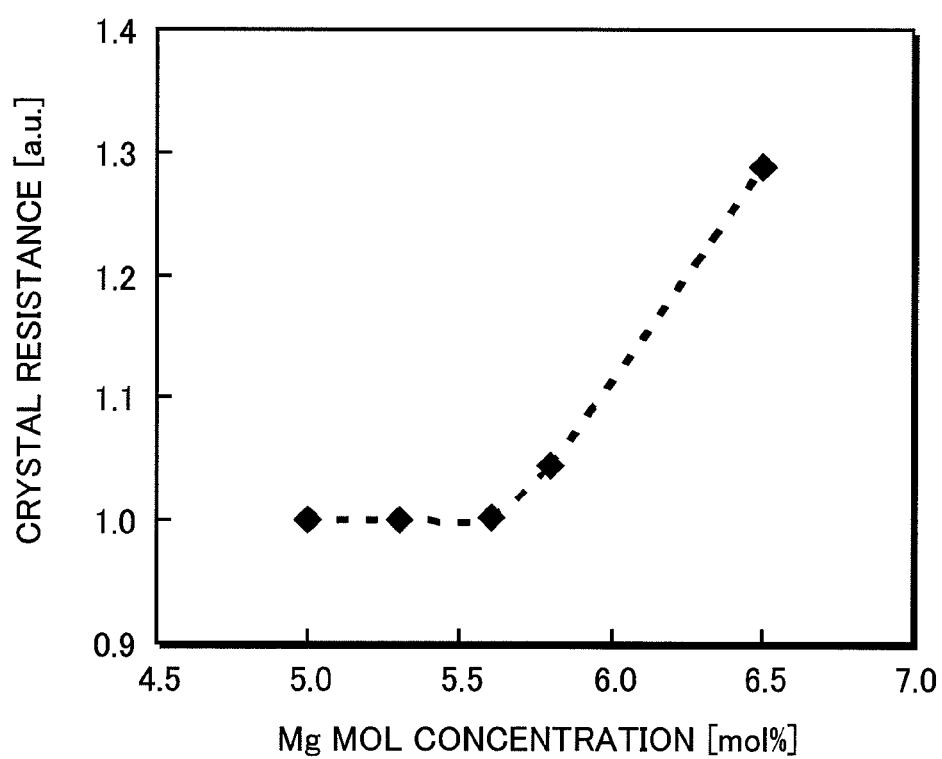

LASER LIGHT SOURCE, IMAGE DISPLAY APPARATUS, AND PROCESSING APPARATUS

BACKGROUND OF THE INVENTION

1. Field of the Invention

The present invention relates to a laser light source provided with a quasi phase matching wavelength conversion element that performs wavelength conversion by utilizing the nonlinear optical effect, and an image display apparatus and a processing apparatus employing such laser light source.

2. Description of the Related Art

A ferroelectric crystal having formed therein a periodically poled region is used for a wavelength conversion element that exploits the inversion of nonlinear polarization, an optical deflector that exploits a prism-shaped or lens-shaped inversion structure, and so forth.

As a method for forming a periodically poled structure in a ferroelectric crystal, a method shown, for example, in FIG. 15, is adopted. Specifically, first polarization directions of a ferroelectric crystal 201 are aligned to a given direction, and then, with the use of a power supply 205 and a partially formed electrode pair 204, an electric field in a direction opposite to a polarization direction 202 of the ferroelectric crystal 201 is applied across the electrode pair 204, so that the polarization direction 202 between the electrode pair 204 is inverted forcedly.

According to this method, a periodically poled region 203 in which the polarization direction 202 is inverted to a direction opposite to the polarization direction in the other region (unpoled region 206) can be formed within the ferroelectric crystal 201. Herein, it is preferable that a distance between two electrodes forming the electrode pair 204 (components projected in the polarization direction) is short. It is therefore preferable that the ferroelectric crystal 201 is cut out along a facet almost perpendicular to the polarization direction with the plate thickness of 2 mm or thinner.

Incidentally, the periodically poled region 203 is dependent on a forming position of the electrode pair 204. It is therefore possible to form a periodically poled structure by forming the electrode pair 204 periodically.

A quasi phase matching (QPM) wavelength conversion element (hereinafter, simply referred to as the wavelength conversion element) manufactured by periodically poling a ferroelectric crystal as described above has been studied extensively in recent years.

In particular, by forming a periodically poled structure in a ferroelectric crystal having a large nonlinear optical constant, such as $LiNbO_3$ (lithium niobate), $LiTaO_3$ (lithium tantalate) (hereinafter, abbreviated as LN and LT, respectively), or the like highly efficient wavelength conversion can be realized.

In addition, by adding Mg, Zn, In, Sc, or the like to an LN or LT crystal, it is possible to improve resistances to optical damage, and perform a high power wavelength conversion at room temperature.

Also, as described in JP-A-2000-147584, by applying an electric filed to an Mg-added LN (hereinafter, denoted as MgLN) substrate using periodic electrodes, it is possible to form a fine periodically poled structure with a period of several μm. By adopting the wavelength conversion element thus manufactured, it is possible to realize a compact short-wavelength light source that is capable of converting wavelengths of light, such as light from a semiconductor laser, and is thereby applicable in the fields of printing, optical information processing, and photo-application instrumentation control. In addition, by converting light from a watt-class high-output laser (fiber laser, solid-state laser crystal, and so forth), a watt-class short-wavelength visible light (green and blue) or a high-output UV laser can be achieved. It thus becomes possible to provide a high-output short-wavelength light source applicable to a high-luminance display, processing and exposure, and the like. A wavelength conversion element has been studied extensively, in particular, for a green laser, oscillations of which with the use of a semiconductor laser are difficult.

Herein, an example of an intra-resonator wavelength conversion laser light source employing a wavelength conversion element that generates green light will be explained in reference to FIG. 16.

As shown in FIG. 16, a wavelength conversion laser light source 700 includes a semiconductor laser chip 701, a solid-state laser crystal 703, a wavelength conversion element 705, a holding member 711 that holds the wavelength conversion element 705, and a control device 712 that controls the wavelength conversion element 705.

In FIG. 16, Dc-axis denotes the C-axis direction of the wavelength conversion element 705 and Df denotes a propagation direction of a fundamental laser light 704.

The semiconductor laser chip 701 generates a pump laser light 702 having a wavelength of 808 nm. It is arranged such that the solid-state laser crystal 703 made of $Nd:YVO_4$ or the like and disposed inside a resonator (to be described later) is pumped by the pump laser light 702 to oscillate a fundamental laser light 704 having a wavelength of 1064 nm. The fundamental laser light 704 is converted into a wavelength-converted laser light 710 having a wavelength of 532 nm (green light), which is a second-order harmonic, within the wavelength conversion element 705 provided in the resonator. Then, the wavelength-converted laser light 710 (532 nm) thus generated is outputted to an outside of the resonator.

As the solid-state laser crystal 703, an $YVO_4$ crystal (1-mm long) added with 2 at % of Nd is used herein. The solid-state laser crystal 703 can be pumped efficiently by allowing the pump laser light 702 to go incident thereon in such a manner that a polarizing direction of the pump laser light 702 and the C-axis direction of the $YVO_4$ crystal coincide with each other.

Dielectric multi-layers 706 and 708 are formed, respectively, on the light-incident and light-output surfaces of the solid-state laser crystal 703. Dielectric multi-layers 709 and 707 are formed, respectively, on the light-incident and light-output surfaces of the wavelength conversion element 705. The dielectric multi-layer 706 formed on the light-incident surface of the solid-state laser crystal 703 prevents reflection of the pump laser light 702 on one hand and reflects the fundamental laser light 704 on the other hand. The dielectric multi-layer 708 formed on the light-output surface of the solid-state laser crystal 703 prevents reflection of the fundamental laser light 704. The dielectric multi-layer 709 formed on the light-incident surface of the wavelength conversion element 705 prevents reflection of the fundamental laser light 704 on one hand and reflects the wavelength-converted laser light 710 on the other hand. The dielectric multi-layer 707 formed on the light-output surface of the wavelength conversion element 705 prevents reflection of the wavelength-converted laser light 710 on one hand and reflects the fundamental laser light 704 on the other hand. Consequently, a resonator in the wavelength range of 1064 nm is formed between the dielectric multi-layer 706 formed on the light-incident surface of the solid-state laser crystal 703 and the dielectric multi-layer 707 formed on the light-output surface of the wavelength conversion element 705. Light having a wavelength of 1064 nm is thus laser-oscillated.

Herein, for the solid-state laser crystal 703 and the wavelength conversion element 705, a bulk type with no waveguide structure has been adopted. However, because part of the fundamental laser light 704 and the wavelength-converted laser light 710 is absorbed within the solid-state laser crystal 703 and the wavelength conversion element 705, resonance takes place between two planes (between the dielectric multi-layers 706 and 707) due to the thermal lens effect.

As the wavelength conversion element 705, a 5-mm-long Mg-added $LiNbO_3$ crystal having a periodically poled structure with a period of about 7 μm (hereinafter, denoted as PPMgLN) is used. By disposing the PPMgLN crystal in such a manner that the C-axis (polarization direction) thereof and the C-axis of the Nd:$YVO_4$ single crystal serving as the solid-state crystal 703 coincide with each other, a coincidence condition of the polarizing direction of the fundamental wave and the polarization direction, which is one of phase matching conditions of the PPMgLN crystal, can be satisfied. The PPMgLN crystal is thus allowed to operate as the wavelength conversion element.

In order to achieve enhanced wavelength conversion efficiency and stability, it is necessary to increase the interaction effect by adjusting refractive indices of the fundamental laser light 704 and the wavelength-converted laser light 710 within the wavelength conversion element 705. Because the refractive index is dependent on temperatures, the temperature of the wavelength conversion element 705 is adjusted to a temperature at which the conversion efficiency reaches the maximum (hereinafter, referred to as the phase matching temperature) using the control device 712. It should be noted that the phase matching temperature can be changed as desired by changing the poling period of the PPMgLN crystal.

The phase matching temperature of the wavelength conversion element 705 can be set to suit the installation environment. For example, when the installation environment is close to room temperature, the phase matching temperature is set to about 20° C. to 40° C. In a case where the installation environment is inside the apparatus where heat is generated considerably, the phase matching temperature is generally set to 60° C. to 80° C. A reduction in conversion efficiency of the wavelength conversion element 705 occurs due to temperature distributions in a propagation direction of the fundamental laser light 704 in the wavelength conversion element 705. It is therefore preferable, in general, to fix the wavelength conversion element 705 to the holding member 711 having high thermal conductivity. For the holding member 711, copper that is inexpensive and has high thermal conductivity and aluminum that has a smaller thermal capacity than copper, and so forth are generally adopted.

However, in a case where the periodically poled structure is formed in a ferroelectric crystal and a laser light source employs this ferroelectric crystal as a wavelength conversion element, a problem arises in that an output of wavelength-converted light emitted from this laser light source is reduced over time.

SUMMARY OF THE INVENTION

An object of the invention is to provide a laser light source which suppresses a reduction in output power of wavelength-converted light over time.

In order to achieve the above object, a laser light source according to one aspect of the invention includes: a fundamental laser generator for generating a fundamental laser light; a wavelength conversion element having formed therein a periodically poled structure, for converting the fundamental laser light into a laser light having a different wavelength, said wavelength conversion element being made of a ferroelectric crystal; a holding member for holding at least a part of an element surface of said wavelength conversion element, said element surface crossing a polarization direction of the periodically poled structure; and an insulation layer provided between the holding member and the element surface, wherein the insulation layer has an electric resistivity of not less than $1 \times 10^8$ Ω·cm.

According to the foregoing structure, the insulation layer having electric resistivity of not less than $1 \times 10^8$ Ω·cm is formed on the element surface of the wavelength conversion element, in a direction of crossing the polarization direction of the periodically poled structure. With this structure, in a portion where the insulation layer is formed, a direct contact between the holding member and the element surface of the wavelength conversion element. In a case where spontaneous polarization within a ferroelectric crystal serving as the wavelength conversion element expands and contracts, charges are generated due to voltage rise effect on the element surface of the wavelength conversion element in a portion where the holding member is not in direct contact. An electric field produced by the charges thus generated causes the polarization wall to generate setoff stress to suppress expansion and contraction of the spontaneous polarization. It thus becomes possible to suppress an increase in the optical absorptance over time within the wavelength conversion element, which in turn makes it possible to suppress a reduction in output over time of a wavelength-converted laser light obtained through wavelength conversion by the wavelength conversion element.

BRIEF DESCRIPTION OF THE DRAWINGS

FIG. 1B is a schematic view of an improved insulation layer of the wavelength conversion laser light source shown in FIG. 1A;

FIG. 2 is an explanatory view showing the transmittance of a fundamental laser light after 1000 hours from the start of an operation with variable electric resistivity of a base material inserted between a wavelength conversion element and a holding member;

FIG. 6A and FIG. 6B are explanatory views showing driving methods of the wavelength conversion laser light source according to one embodiment of the invention, wherein FIG. 6A shows an intermittent driving and FIG. 6B shows a pulse-driving;

FIG. 7 is a graph showing a relation between mol concentration of Mg and crystal resistance in a wavelength conversion element made of MgLN crystal;

DETAILED DESCRIPTION OF THE INVENTION

Hereinafter, embodiments of the invention will be described with reference to the drawings.

First Embodiment

A laser light source according to one embodiment of the invention will be described in the following with reference mainly to FIG. 1A through FIG. 4, FIG. 6A, and FIG. 6B. As will be described in detail below, the laser light source in accordance with the present embodiment is capable of suppressing a decrease in output of a wavelength-converted laser light over time.

Firstly, results of comparative experiments using a conventional laser light source will be explained to ease the explanations of the laser light source in accordance with the present embodiment.

Figure 16:
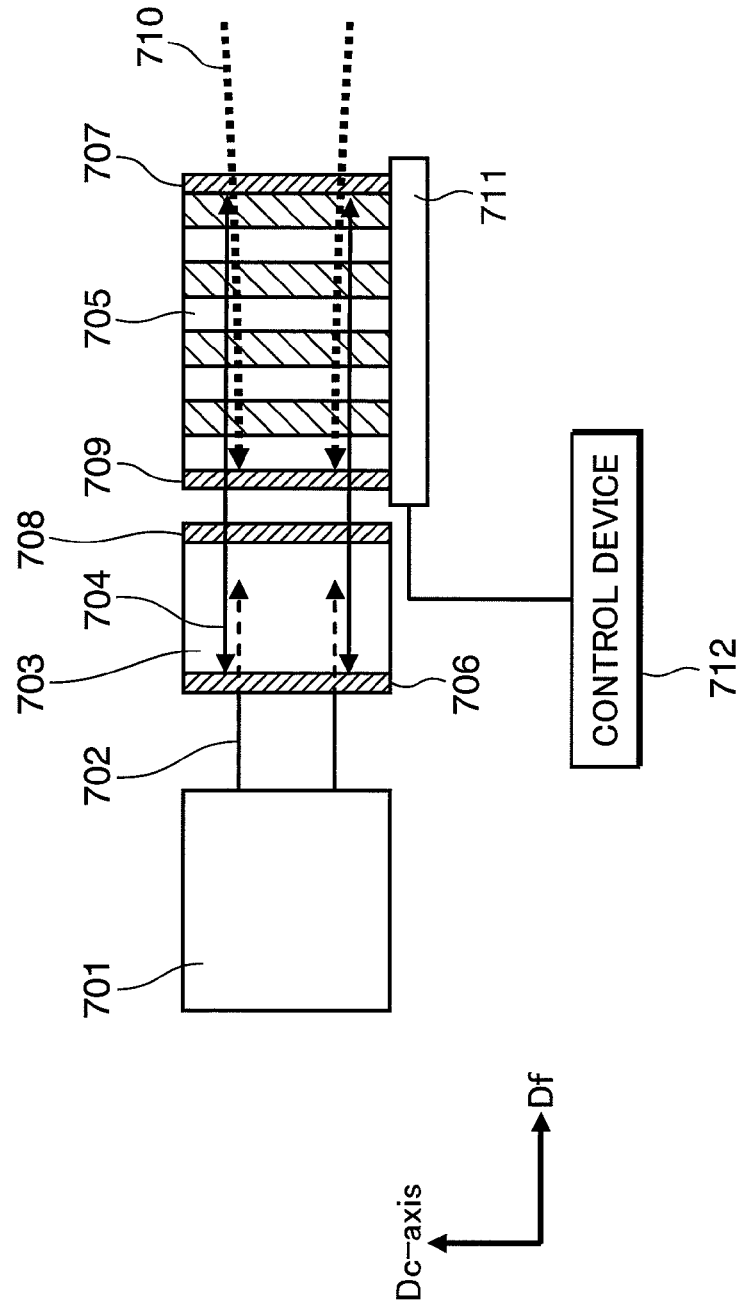
FIG. 16 is an explanatory view schematically showing the structure of a conventional wavelength conversion laser light source.
Figure 17:
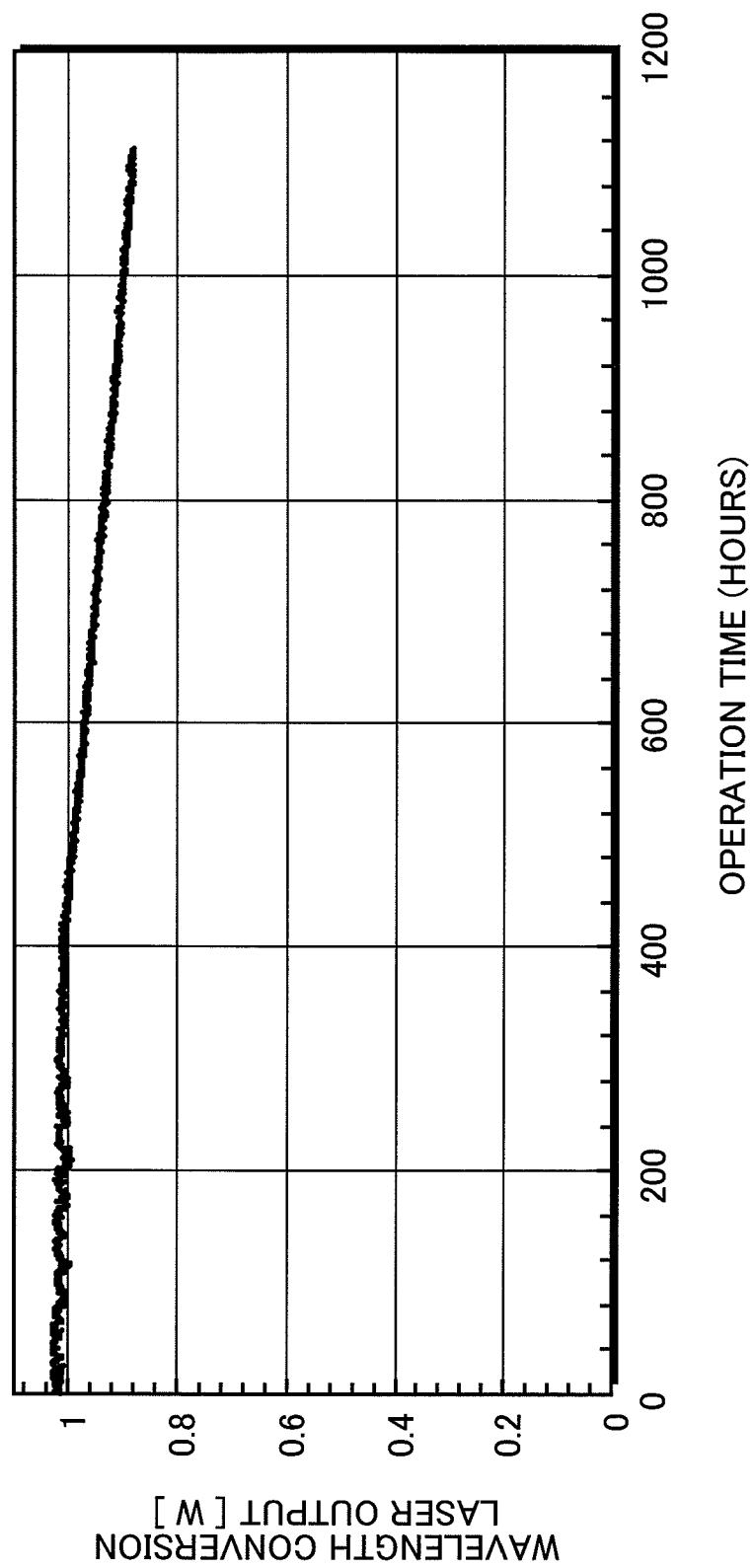
FIG. 17 is a graph showing a reduction in output of the conventional wavelength conversion light source with respect to an operation time.

As a comparative experiment using the conventional wavelength conversion laser light source 700 shown in FIG. 16, the wavelength conversion laser light source 700 was pulse-driven for 1000 hours under the conditions that the peak output was 1 W, the repeating frequency was 100 kHz, and the duty was 50%. As shown in FIG. 17, it becomes obvious from the results of this comparative experiment that an output power of a wavelength-converted laser light started being gradually decreased from when the operation time of the wavelength conversion laser light source 700 exceeded 400 hours.

Reduction in output of the conventional intra-resonator wavelength conversion laser light source is attributed to a decrease in the Q value within the resonator, that is, the occurrence of an optical loss in the resonator.

It should be noted that, in this comparative experiment, no taint damage was observed on any of the end faces of the solid-state laser crystal 703 and the wavelength conversion element 705 shown in FIG. 16. Also, a mirror that reflects a fundamental laser light was used instead of the wavelength-converted element 705 and optical absorptance within the solid-state laser crystal 703 was evaluated from the oscillation efficiency of a fundamental laser light of the solid-state laser crystal 703. It was then confirmed that what was increased is not the light absorptance of the solid-state laser crystal 703 itself.

Figure 18:
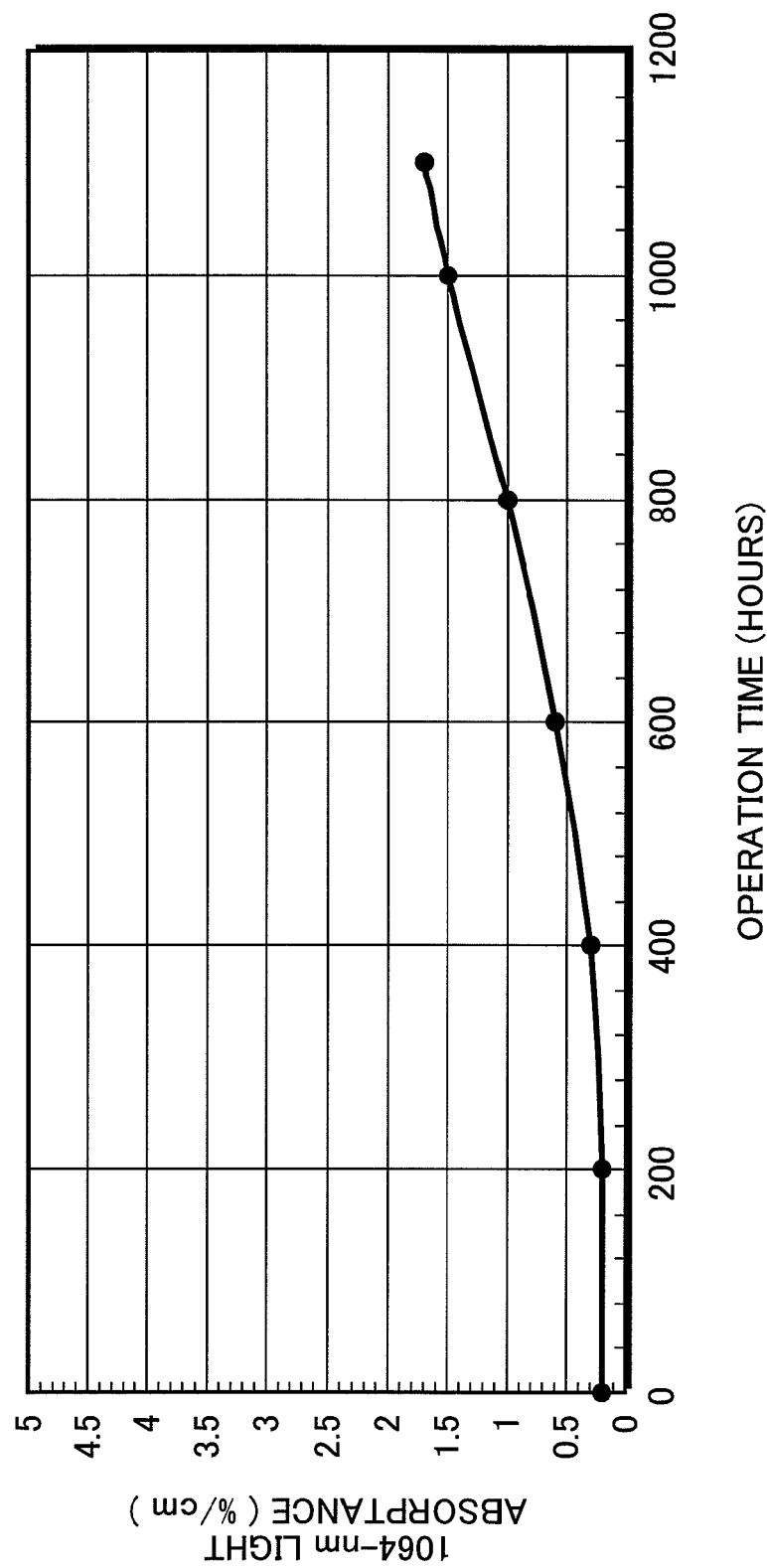
FIG. 18 is a graph showing an increase in the optical absorptance within the wavelength conversion element in the conventional wavelength conversion laser light source with respect to the operation time.

Accordingly, in the conventional wavelength conversion laser light source 700 shown in FIG. 16, the wavelength conversion element 705 was heated so that an evaluation was made in a state brought out of the phase matching conditions using a method of calculating the optical absorptance within the wavelength conversion element 705 from an internal loss of the resonator. The result is set forth in FIG. 18. It is understood that the optical absorptance of 1064-nm light of the wavelength conversion element increases as the continuous operation time increases hour by hour. The optical absorptance was about 0.2%/cm in the initial state, and was increased to 0.6%/cm after 600 hours and to 1.7%/cm after 1100 hours when the measurement was ended.

An increase in the optical absorptance of the wavelength conversion element under the same conditions also occurred in a crystal, which was $LiNbO_3$ (lithium niobate: LN) or $LiTaO_3$ (lithium tantalate: LT) added with metals, such as Mg, Zn, In, Sc, and Fe and provided with the periodically poled structure, and in a crystal, which was KTP provided with the periodically poled structure.

A wavelength conversion laser light source 100 in accordance with the present embodiment will now be described in the following using FIG. 1A, which is capable of suppressing an increase in optical absorptance over time in the wavelength conversion element occurring in the conventional laser light source described above.

The wavelength conversion laser light source 100 in accordance with the present embodiment is an intra-resonator green laser light source as with the wavelength conversion laser light source 700 described above with reference to FIG. 16. Accordingly, members having the same structures and functions of those in the wavelength conversion light source 700 will be designated by the same reference numerals, and the descriptions thereof shall be omitted where appropriate.

The wavelength conversion laser light source 100 includes a semiconductor laser chip 701 (fundamental laser light source and pump laser light source), a solid-state laser crystal 703 (fundamental laser light source and fundamental wave oscillator), a wavelength conversion element 705, holding members 711 and 102 that hold the wavelength conversion element 705, dielectric multi-layers 706 through 709, insulation layers 101, and a control device 712 that controls the wavelength conversion element 705.

Figure 1A:
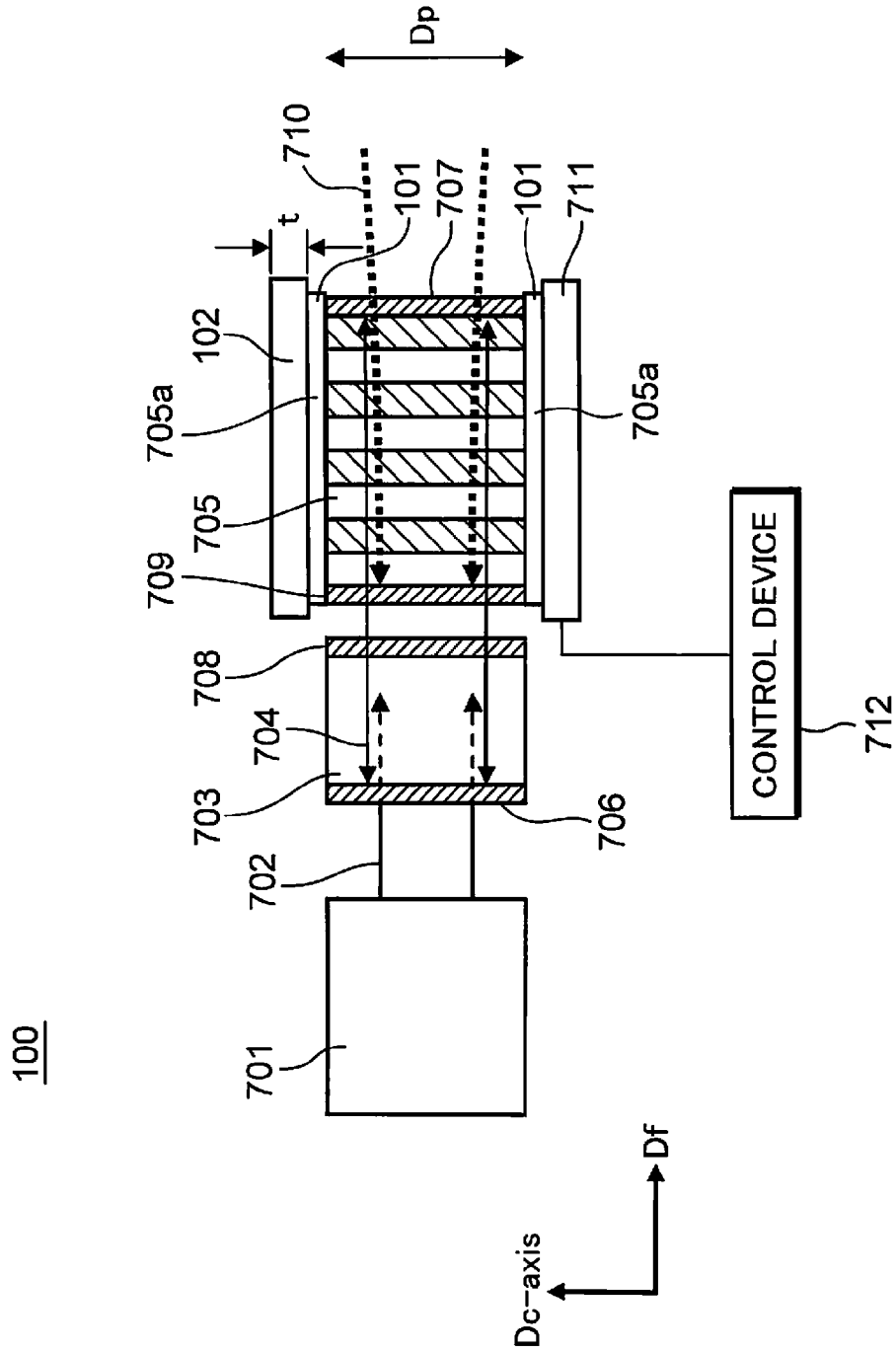
FIG. 1A is an explanatory view schematically showing an example of the structure of a wavelength conversion laser light source according to one embodiment of the invention.

In FIG. 1A, Dc-axis denotes the C-axis direction of the wavelength conversion element 705, Df denotes a propagation direction of a fundamental laser light 704, and Dp denotes a polarization direction of a periodically poled structure. Also, a small letter t denotes the thickness of the holding member 102.

The semiconductor laser chip 701 generates a pump laser light and the solid-state laser crystal 703 is pumped by the pump laser light to oscillate a fundamental laser light (for example, light having a wavelength of 1064 nm). These semiconductor laser chip 701 and solid-state laser crystal 703 form a fundamental laser generator. The solid-state laser crystal 703 is a crystal made of $YVO_4$ added, for example, with Nd or Yb.

The wavelength conversion element 705 converts the fundamental laser light to a laser light having a different wavelength (for example, the wavelength wave laser light having a wavelength of 1064 nm is converted to 532-nm green light, which is a second-order harmonic). The wavelength conversion element 705 is made of a ferroelectric crystal with a periodically poled structure. For the wavelength conversion element 705, it is preferable to adopt a ferroelectric crystal essentially made of $LiNbO_3$ or $LiTaO_3$.

The dielectric multi-layer 706 and the dielectric multi-layer 708 are formed, respectively, on the light-incident and light-output surfaces of the solid-state laser crystal 703. Likewise, the dielectric multi-layer 709 and the dielectric multi-layer 707 are formed, respectively, on the light-incident and light-output surfaces of the wavelength conversion element 705. The respective dielectric multi-layers have properties as follows.

The dielectric multi-layer 706 formed on the light-incident surface of the solid-state laser crystal 703 has functions of preventing reflection of the pump laser light 702 and reflecting the fundamental laser light 704 (reflectance of 99% or higher).

The dielectric multi-layer 708 formed on the light-output surface of the solid-state laser crystal 703 has a function of preventing reflection of the fundamental laser light 704.

The dielectric multi-layer 709 formed on the light-incident surface of the wavelength conversion element 705 has functions of preventing reflection of the fundamental laser light 704 and reflecting a wavelength-converted laser light 710 (reflectance of 90% or higher).

The dielectric multi-layer 707 formed on the light-output surface of the wavelength conversion element 705 has functions of preventing reflection of the wavelength-converted laser light 710 and reflecting the fundamental laser light 704 (reflectance of 99% or higher).

According to the foregoing structure, a resonator in the wavelength range of 1064 nm is formed between the dielectric multi-layer 706 formed on the light-incident surface of the solid-state laser crystal 703 and the dielectric multi-layer 707 formed on the light-output surface of the wavelength conversion element 705. Light having a wavelength of 1064 nm is thus laser-oscillated.

The holding members 711 and 102 hold at least a part of the element surfaces 705a of the wavelength conversion element 705 that cross the polarization direction of the periodically poled structure. In the example structure shown in FIG. 1A, the holding members 711 and 102 hold the element surfaces 705a entirely.

The insulation layers 101 are provided between the respective holding members 711 and 102 and the respective element surfaces 705a. The wavelength conversion laser light source 100 of the present embodiment is different from the conventional wavelength conversion laser light source 700 shown in FIG. 16 in that the installation surfaces of the holding members 711 and 102 for holding thereon the wavelength conversion element 705 are covered with the insulation layers 101.

More specifically, it is arranged such that the insulation layer 101 is interposed between the holding member 711 and the wavelength conversion element 705 so as to prevent a direct contact between the holding member 711 and the wavelength conversion element 705. With the foregoing structure, it becomes possible to suppress a reduction in output caused by an increase in the optical absorptance over time, which is a problem associated with the conventional structure.

As described, the wavelength conversion element 705 is made of a ferroelectric crystal having formed therein the periodically poled structure. In the periodically poled structure having a plurality of polarization walls along which spontaneous polarization inverted regions lie adjacent to each other, when the crystal temperature changes abruptly, the magnitude of the spontaneous polarization changes, which gives rise to expansion and contraction of the spontaneous polarization within the ferroelectric crystal. This change in the spontaneous polarization gives stress to the crystal structure at the polarization walls and gives rise to a crystal defect. This crystal defect consequently causes an increase in the optical absorptance within the ferroelectric crystal. In order to suppress an increase in the optical absorptance, as the structure described above, the insulation layers 101 are formed on the element surfaces 705a of the wavelength conversion element 705 that cross the polarization direction of the periodically poled structure. With this structure, a direct contact between the holding members 711 and 102 and the element surfaces 705a of the wavelength conversion element 705 can be avoided in areas where the insulation layers 101 are formed. In the case where the spontaneous polarization within the ferroelectric crystal serving as the wavelength conversion element 705 expands and contracts, charges are generated on the element surfaces 705a due to the voltage rise effect in a portion of the element surfaces 705a of the wavelength conversion element 705 where the holding members 711 and 102 are not in direct contact. An electric field produced by the charges thus generated causes the polarization walls to generate setoff stress so as to suppress expansion and contraction of the spontaneous polarization. It is therefore possible to suppress an increase in the optical absorptance over time within the wavelength conversion element 705, which in turn makes it possible to suppress output deterioration over time of the wavelength-converted laser light 710 obtained through wavelength conversion by the wavelength conversion element 705.

FIG. 2 shows the fundamental wave (laser) transmittance after 1000 hours from the start of operation in a case where the holding members 711 and 102 made of metal were provided to the wavelength conversion element 705 on the surfaces crossing the C-axis direction (the element surfaces 705a crossing the polarization direction of the periodically poled structure) and electric resistivity of a base material inserted between the wavelength conversion element 705 and the respective holding members 711 and 102 was changed. The element length of each sample under conditions 1 through 6 specified below was 20 mm. In the following, the respective sample conditions 1 through 6 will be described.

(Condition 1)

After conductive silver paste (electric resistivity: $5 \times 10^{-5}$ $\Omega \cdot cm$) was applied on the element surfaces 705a of the wavelength conversion element 705 in a thickness of 50 μm, the conductive silver paste was brought into contact with the holding members 711 and 102 made of copper.

(Condition 2)

After an insulating coating material A (electric resistivity: $1 \times 10^8$ $\Omega \cdot cm$) was applied on the element surfaces 705a of the wavelength conversion element 705 in a thickness of 50 μm, the insulating coating material A was brought into contact with the holding members 711 and 102 made of copper.

(Condition 3)

After an insulating coating material B (electric resistivity: $2 \times 10^{11}$ $\Omega \cdot cm$) was applied on the element surfaces 705a of the wavelength conversion element 705 in a thickness of 50 μm, the insulating coating material B was brought into contact with the holding members 711 and 102 made of copper.

(Condition 4)

$SiO_2$ films were deposited on the element surfaces 705a of the wavelength conversion element 705 in a thickness of 10000 angstroms by RF sputtering, and the $SiO_2$ films were brought into contact with the holding members 711 and 102 made of copper.

(Condition 5)

SiO$_2$ films were deposited on the element surface 705a of the wavelength conversion element 705 in a thickness of 10000 angstroms by plasma CVD (Chemical Vapor Deposition), and the SiO$_2$ films were brought into contact with the holding members 711 and 102 made of copper.
(Condition 6)

A reference element (the wavelength conversion element 705 was suspended in air without using a base material nor holding members).

An experiment was conducted by continuously operating the respective samples under the conditions specified above for 1000 hours. Regarding the reference element (condition 6), it was confirmed that the fundamental wave transmittance had not changed after 1000 hours of continuous operation in comparison with the transmittance at the start of operation. Further, under the condition 3 and the condition 5, it was also confirmed that the fundamental wave transmittance had not changed after 1000 hours of continuous operation in comparison with the transmittance at the start of operation. Also, under the condition 2, the fundamental wave transmittance dropped only slightly by about 0.8% after 1000 hours of continuous operation in comparison with the transmittance at the start of operation.

On the contrary, under the condition 1, it was confirmed that the fundamental wave transmittance dropped significantly by 3.2% after 1000 hours of continuous operation with respect to the transmittance at the start of operation. Also, under the condition 4, although there was a slight improvement in comparison with the result under the condition 1, it was also confirmed that the fundamental wave transmittance dropped significantly by 2.4%.

Also, even when a nitride film, such as SiN, was used instead of depositing an oxide film by plasma CVD under the condition 5, the same result was obtained. In addition, regarding the film deposition method under the condition 5, even in a case where an insulation layer was deposited by ECR sputtering instead of plasma CVD, the same effect (the fundamental wave transmittance had not dropped) was obtained.

Also, regarding the experiment results as above, the same results were obtained when a crossing angle of the polarization direction of the periodically poled structure of the wavelength conversion element 705 and the element surfaces 705a (installation surfaces of the holding members 711 and 102) fell within a range of 90°±30°.

In view of the foregoing, it is preferable that the insulation layers 101 are made of an insulating material having electric resistivity of 1×10$^8$ Ω·cm or higher. In this case, an increase in the optical absorptance in portions covered with the insulation layers 101 can be reduced to 25% or less of the conventional case. It thus becomes possible to reduce output deterioration of the wavelength-converted light of the wavelength conversion laser light source 100 to about 33% or less of the conventional case.

Also, it is further preferable that the electric resistivity of the insulation layers 101 is 2×10$^{11}$ Ω·cm or higher. In this case, an increase in the optical absorptance in portions covered with the insulation layers 101 can be reduced markedly. It thus becomes possible to substantially eliminate output deterioration of the wavelength conversion laser light source 100.

The insulation layers 101 can be formed, for example, by vapor deposition. Alternatively, an oxide film or a nitride film, such as SiN, may be used as the insulation layers 101, so that these films are formed by plasma CVD. The same effect was obtained in this case, too. Further, the same effect was obtained in a case where ECR sputtering was employed as the deposition method instead of plasma CVD, and the insulation layers formed by ECR sputtering were used.

It is preferable to use an oxide substance film or a nitride film, such as SiN, deposited by plasma CVD as the insulation layers 101 of the present embodiment. In this case, it is possible to form the insulation layers 101 minutely with fewer impurities. Hence, in comparison with a case where films are deposited by RF sputtering or DC sputtering, insulation layers 101 having fewer impurities can be deposited. It is therefore possible to suppress an increase in the optical absorptance and also to suppress a problem of output deterioration more effectively.

In a case where the electric resistivity of the insulation layers 101 is 1×10$^8$ Ω·cm or higher, it is preferable that the thickness of the insulation layers 101 is 10000 angstroms or thicker. Also, in a case where the electric resistivity of the insulation layers 101 is 2×10$^{11}$ Ω·cm or higher, it is preferable that the thickness of the insulation layers 101 is 4000 angstroms or thicker. In this case, a particularly high output deterioration suppressing effect can be obtained.

Also, as with the conventional structure, it is preferable to use metals that are inexpensive and have high thermal conductivity as the holding members 711 and 102. To be more concrete, it is preferable to use a holding member having a thickness of at least 50 μm and thermal conductivity of 50 W/(m·K) or higher. In this case, it becomes possible to effectively suppress deterioration of conversion efficiency caused by a temperature distribution in the propagation direction of a fundamental laser light.

It is preferable to provide the insulation layers 101 on the element surfaces 705a of the wavelength conversion element 705 in not less than 75% of the portion held by the holding members 711 and 102. In this case, it becomes possible to suppress deterioration of conversion efficiency from fundamental waves to higher harmonics more effectively.

Also, it is preferable that the thickness of the insulation layers 101 is 150 μm or less and the thermal conductivity of the insulation layers 101 is 2 W/(m·K) or higher. In this case, it becomes possible to suppress deterioration of conversion efficiency from fundamental waves to higher harmonics more effectively.

In a case where a wavelength-converted laser light exceeding 1 W is to be generated, it is preferable to use the holding members 711 and 102 having a thickness of 50 μm or thicker and the thermal conductivity of 220 W/(m·K) or higher. When configured in this manner, it becomes possible to eliminate the instability of an output of the wavelength-converted laser light induced by a change of the temperature distribution in the propagation direction of the fundamental laser light.

It is preferable to use, for example, copper (thermal conductivity: about 400 W/(m·K)), aluminum (thermal conductivity: about 240 W/(m·K)), and so forth as the holding members 711 and 102.

An insulator having relatively high thermal conductivity, such as a graphite sheet, may be used as the holding members 711 and 102. However, because the electric resistivity of a graphite sheet is less than 1×10$^8$ Ω·cm, a graphite sheet cannot play a role of the insulation layers 101 sufficiently. It is therefore preferable to use the insulation layers 101 having electric resistivity of at least 1×10$^8$ Ω·cm, and more preferably 2×10$^{11}$ Ω·cm or higher even when a graphite sheet is used as the holding members 711 and 102.

As is shown in FIG. 1A, the wavelength conversion laser light source 100 of the present embodiment includes the holding member 102 made of a material having high thermal conductivity on the wavelength conversion element 705 also on the surface opposing the holding member 711. With the foregoing structure, a higher heat dissipation can be achieved.

Also, $LiNbO_3$ (lithium niobate: LN) or $LiTaO_3$ (lithium tantalate: LT) without the periodically poled structure has electric resistivity of $1\times10^{13}$ Ω·cm or higher. Accordingly, lithium niobate or lithium tantalate without the periodically poled structure may be used as the insulation layers 101.

Figure 4:
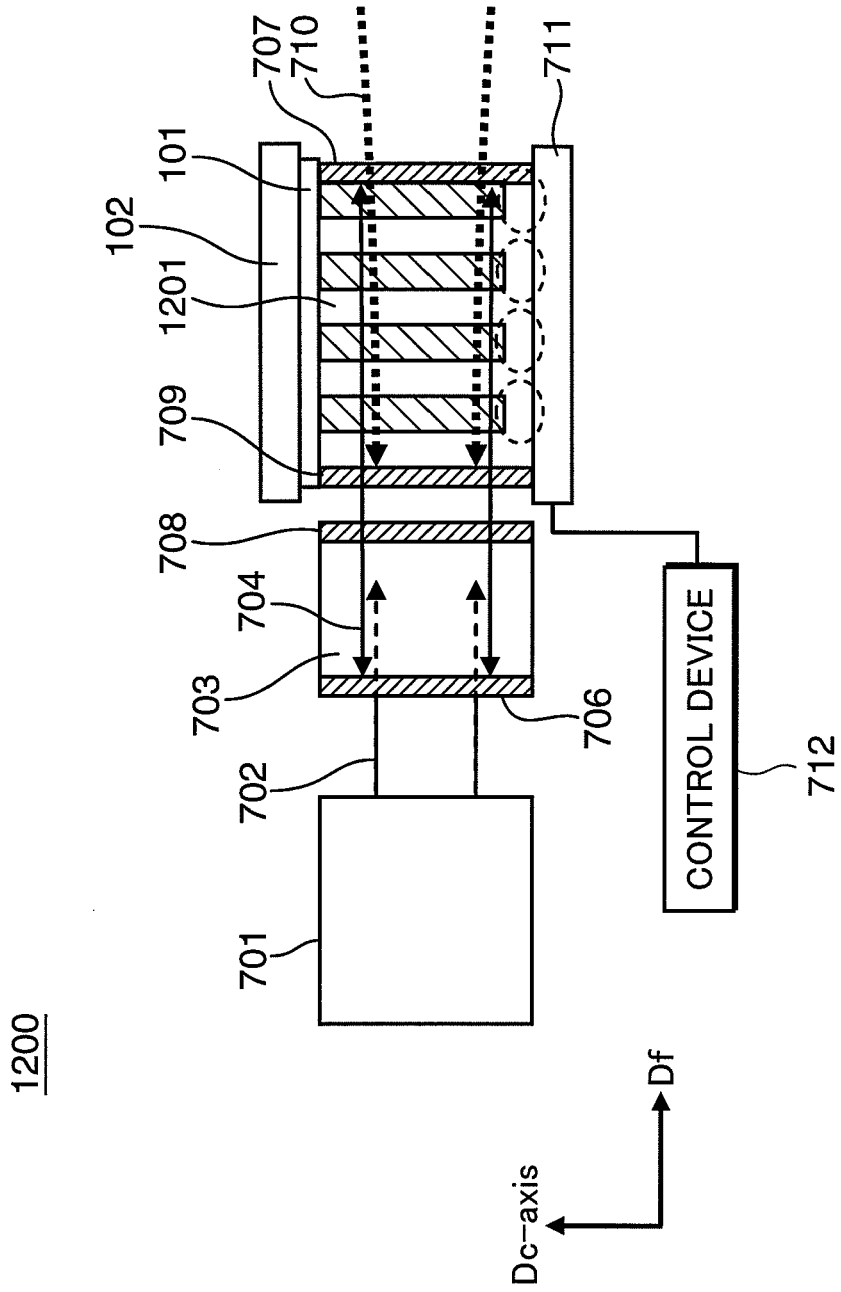
FIG. 4 is an explanatory view schematically showing still another example of the structure of the wavelength conversion laser light source according to one embodiment of the invention.

For example, as a wavelength conversion laser light source 1200 shown in FIG. 4, it may be possible to use, as the wavelength conversion element of the present embodiment, a wavelength conversion element 1201 having periodically poled regions that do not reach either one of the surfaces for holding thereon the holding members 711 and 102. In this case, because a surface on which the polarization direction is constant (a region where the periodically poled regions are not formed) functions as the insulation layer, there is no need to newly form another insulation layer on the surface on which the polarization direction is constant.

In FIG. 4, Dc-axis denotes the C-axis direction of the wavelength conversion element 1201 and Df denotes a propagation direction of the fundamental laser light 704.

It is preferable that the wavelength conversion element 705 and the insulation layer 101 are made of the same material. For example, in a case where the wavelength conversion element 705 is a ferroelectric crystal essentially made of LN with the periodically poled structure, LN without the periodically poled structure is used as the insulation layer 101. In a case where the wavelength conversion element 705 is a ferroelectric crystal essentially made of LT with the periodically poled structure, as is with the above case, LT without the periodically poled structure is used as the insulation layer 101. In this case, because a difference of thermal expansion coefficients between the wavelength conversion element 705 and the insulation layer 101 becomes small, it becomes possible to prevent application of stress induced by a temperature change on two crystals, which are the wavelength conversion element 705 and the insulation layer 101 laminated to each other. It thus becomes possible to efficiently prevent deterioration of wavelength conversion resulting from a stress-induced change of refractive index. In order to make the wavelength conversion element 705 and the insulation layer 101 out of the same material, the wavelength conversion element of the structure shown in FIG. 4 (the one having the periodically poled regions that do not reach either one of the surfaces for holding thereon the holding members 711 and 102) may be used as well.

In a case where an LN material is used as the wavelength conversion element 705, it is preferable to use silicon having a thermal expansion coefficient close to that of LN as the holding member 711. With this structure, the same effect can be achieved. Further, because silicon also has high thermal conductivity (about 140 W/(m·K)), by using silicon as the holding members 711 and 102, it becomes possible to reduce problems, such as a reduction in conversion efficiency and instability induced by a temperature distribution in the propagation direction of a fundamental laser light.

Also, an insulating adhesive agent may be used as the insulation layers 101. It is preferable to use an insulating adhesive agent having electric resistivity of about $1\times10^8$ Ω·cm or higher as such an adhesive agent, and it is more preferable to use an insulating adhesive agent having electric resistivity of $2\times10^{11}$ Ω·cm or higher. In this case, as has been described above, it becomes possible to effectively reduce output deterioration of wavelength-converted light of the wavelength conversion laser light source 100. Further, by using an insulating adhesive agent as the insulation layers 101, the wavelength conversion element can be protected and fixed at the same time. It thus becomes possible to reduce the manufacturing costs of the wavelength conversion laser light source 100.

The inventors of the present application also discovered in the experiment described above with reference to FIG. 2 that the optical absorption over time increases more abruptly when the crossing angle of the polarization direction of the periodically poled structure of the wavelength conversion element 705 (the C-axis direction of the wavelength conversion element) and the element surfaces 705a (installation surfaces of the holding members 711 and 102) falls with a range of 90°±30°. Hence, when the angle formed between the polarization direction of the periodically poled structure of the wavelength conversion element 705 and the element surfaces 705a falls within a range of 60° to 120° both inclusive, the output deterioration suppressing effect by the wavelength conversion laser light source 100 of the present embodiment becomes particularly noticeable.

Also, more significant influences are given to an increase in the optical absorption, which is the problem to be solved by the invention, as the poling period of the wavelength conversion element 705 becomes shorter. Accordingly, in a case where a wavelength conversion element 705 formed with a short poling period is used, the effect by the wavelength conversion laser light source of the present embodiment becomes particularly noticeable. To be more specific, it is particularly useful for a wavelength conversion element 705 with a poling period of 20 μm or shorter.

Incidentally, as has been described, regarding the insulation layers 101, it is preferable to provide the insulation layers 101 on the element surfaces 705a of the wavelength conversion element 705 in not less than 75% of the portion held by the holding members 711 and 102. It goes without saying that the insulation layers 101 can be provided to the surfaces held by the holding members 711 and 102 entirely (100%). However, according to the structure shown in FIG. 1A, the wavelength-converted light (for example, 532-nm green light) shows higher intensity on the light-exiting side of the wavelength conversion element 705 than on the light-incident side. Accordingly, there is a tendency that the temperature becomes higher on the light-exiting side of the wavelength conversion element 705 than on the light-incident side. Under these circumstances, by forming the insulation layers 101 in a broader range on the light-exiting side of the wavelength conversion element 705 than on the light-incident side as shown in FIG. 1B, it becomes possible to lessen a variance of the temperature distribution in the propagation direction of a fundamental laser light within the wavelength conversion element 705. More specifically, by adjusting the forming positions of the insulation layers 101 as described above, the optical absorptance is reduced more on the light-exiting side of the wavelength conversion element 705 than on the light-incident side, which suppresses heat generation of the wavelength conversion element 705 induced by optical absorption. In this manner, a variance of the temperature distribution between the light-incident side and the light-exit side of the fundamental laser light within the wavelength conversion element 705 can be lessened. By lessening a variance of the temperature distribution, it becomes possible to reduce deterioration of the wavelength conversion efficiency. The same applies to the structure of FIG. 5 described below.

Also, in the case of the intra-resonator wavelength conversion laser light source 100 as with the present embodiment, the resonance condition is determined by the thermal lens effect occurring in the solid-state laser crystal and the wavelength conversion element inside the resonator. More specifically, the convergence effect resulting from the thermal lens effect changes with a change of the optical absorptance and so does the resonance condition. As described above, with the intra-resonator wavelength conversion laser light source in which the resonance condition is dependent on the internal thermal lens effect, the spread angle of a laser light emitted from the wavelength conversion laser light source depends on the optical absorptance of the wavelength conversion element. This poses a problem that the spread angle of a laser light emitted from the wavelength conversion laser light source changes with an increase in the optical absorptance. For a light source employed in displays, or medical or processing use, there arises a problem that the light use efficiency deteriorates with a change of the spread angle of exiting light. Hence, by employing the wavelength conversion laser light source of the present embodiment which is capable of suppressing deterioration of the optical absorptance, it is possible to achieve the effect of suppressing the problems described above in the structure wherein the thermal lens effect gives influences to the spread angle of a laser light emitted from the wavelength conversion laser light source. As such a wavelength conversion laser light source, there are wavelength conversion laser light sources of a bulk type, a two-dimensional waveguide type, a multi-mode three-dimensional waveguide type.

In other words, in a case where the wavelength conversion laser light source described above is used, the localization of light intensity can be lessened in comparison with a wavelength conversion laser light source of a single-mode three-dimensional waveguide type that is independent of the thermal lens effect. It thus becomes possible to further reduce an increase in the optical absorptance.

Figure 3:
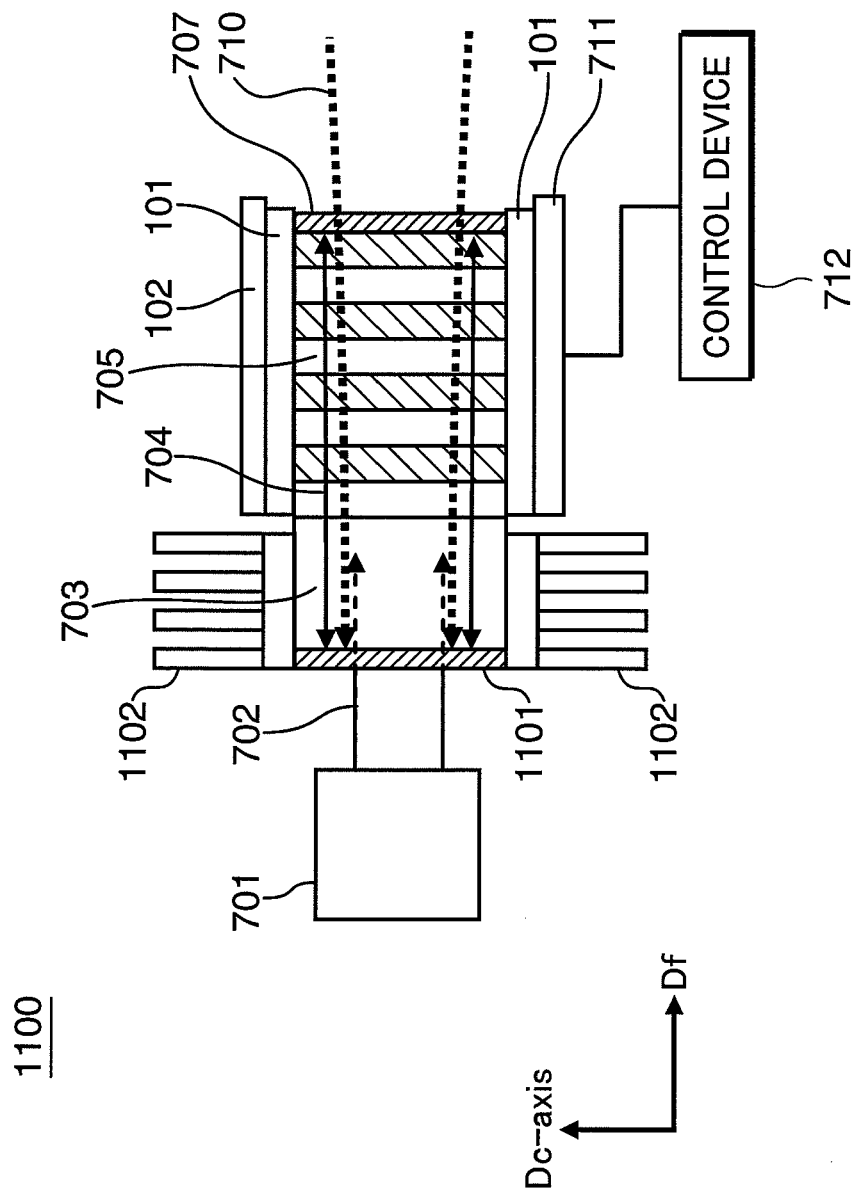
FIG. 3 is an explanatory view schematically showing another example of the structure of the wavelength conversion laser light source according to one embodiment of the invention.

FIG. 3 shows a still another example of the structure of the wavelength conversion laser light source of the present embodiment. A wavelength conversion laser light source 1100 of FIG. 3 is different from the wavelength conversion laser light source shown in FIG. 1A in that the light-output surface of the solid-state laser crystal 703 and the light-incident surface of the wavelength conversion element 705 are joined to each other.

In FIG. 3, Dc-axis denotes the C-axis direction of the wavelength conversion element 1100 and Df denotes a propagation direction of the fundamental laser light 704.

As has been described above, the solid-state laser crystal 703 is a crystal made of $YVO_4$ added, for example, with Nd or Yb.

A crystal, which is LN or LT added with a metal additive, such as Mg, Zn, In, Sc, and Fe of up to 9 mol %, has about the same refractive index as that of $YVO_4$. Hence, by using these crystals as the solid-state laser crystal 703 ($YVO_4$) and the wavelength conversion element 705 (metal-added LN or LT), as is shown in FIG. 3, it becomes possible to join the light-output surface of the solid-state laser crystal 703 and the light-incident surface of the wavelength conversion element 705 to each other. Each of the contacting surfaces of the solid-state laser crystal 703 and the wavelength conversion element 705 can be joined directly to each other, for example, by bringing these surfaces into contact with each other after a hydrophilic treatment followed by a heat treatment.

In this case, the dielectric multi-layers 708 and 709 of FIG. 1A formed with the purpose to prevent a loss of a fundamental laser light can be omitted. It is therefore possible to achieve a more inexpensive wavelength conversion laser light source 1100. In addition, it is possible to achieve a more compact wavelength conversion laser light source.

With the foregoing structure; however, it is preferable that a dielectric multi-layer 1101 formed on the light-incident surface of the solid-state laser crystal 703 has functions of preventing reflection of the pump laser light 702 and reflecting both the fundamental laser light 704 and the wavelength-converted laser light 710. In this case, it becomes possible to align emission directions of the wavelength-converted laser light 710 in one direction, which makes it possible to achieve a wavelength conversion laser light source by employing a further compact optical system.

A heat value within the solid-state laser crystal 703 is about ten times larger than a heat value within the wavelength conversion element 705. Hence, according to the structure shown in FIG. 3, the temperature becomes higher on the light-incident side of the wavelength conversion element 705 than on the light-exiting side, which gives rise to a larger variance of the temperature distribution from the light-incident surface to the light-output surface of the wavelength conversion element 705, and more significant influences are given to deterioration of the wavelength conversion efficiency.

To overcome this inconvenience, as is shown in FIG. 3, it is preferable to further provide a heat sink portion 1102 that dissipates heat from the side of the solid-state laser crystal 703. With this structure, the heat sink portion 1102 formed on the outer periphery of the solid-state laser crystal 703 suppresses heat generation of the solid-state laser crystal 703, which can in turn suppress a temperature rise on the light-incident side of the wavelength conversion element 705. Accordingly, a variance of the temperature distribution in the propagation direction of a fundamental laser light within the wavelength conversion element 705 is lessened, which makes it possible to reduce deterioration of the conversion efficiency during high-output wavelength conversion. Also, it is further preferable to use the wavelength conversion element 705 by controlling the entire wavelength conversion element 705 to be at a high temperature at least as high as 220° C. In this case, it becomes possible to suppress deterioration of the wavelength conversion efficiency by suppressing the temperature distribution occurring within the wavelength conversion element 705 from the light-incident side to the light-exiting side more effectively.

Each time the wavelength conversion laser light source 1100 is turned ON or OFF, it is necessary to heat or cool the wavelength conversion element 705 from the temperature when the wavelength conversion element 705 is not in use (installation environment temperature) to the temperature while it is in use (phase matching temperature) or vice versa. With the structure shown in FIG. 3, it is necessary to design the temperature in use to a high temperature for the foregoing reason. This entails a large temperature change of the wavelength conversion element 705 each time the wavelength conversion laser light source 1100 is turned ON or OFF. It is also confirmed in the experiment that the optical absorptance increases more as the temperature change of the wavelength conversion element 705 becomes larger as described above. Hence, the effect of the present embodiment is more significant as the phase matching temperature of the wavelength conversion element 705 becomes higher. In particular, in a case where the wavelength conversion element 705 is used at or above 150° C., the effect of the invention is enormous.

Incidentally, as has been described, regarding the insulation layers 101, it is preferable to provide the insulation layers 101 on the element surfaces 705a of the wavelength conversion element 705 in not less than 75% of the portion held by the holding members 711 and 102. In the structure shown in FIG. 3, because there is a tendency that the temperature becomes higher on the light-incident side of the wavelength conversion element 705 than on the light-exiting side, by forming the insulation layers 101 in a broader range on the light-incident side of the wavelength conversion element 705 than on the light-exiting side, it becomes possible to lessen a variance of the temperature distribution in the propagation direction of a fundamental laser light within the wavelength conversion element 705. More specifically, by adjusting the forming positions of the insulation layers 101 as described above, the optical absorptance is reduced more on the light-incident side of the wavelength conversion element 705 than on the light-exiting side, which suppresses heat generation of the wavelength conversion element 705 caused by optical absorption. With the foregoing structure, variations in the temperature distribution between the light-incident side and the light-exit side of the fundamental laser light within the wavelength conversion element 705 can be made smaller. With smaller variations in the temperature distribution, it becomes possible to reduce deterioration of the wavelength conversion efficiency.

Also, in a case where the wavelength conversion laser light source 100 or 1100 of the present embodiment is employed as a light source for a display, fast start-up within three seconds is preferable. Hence, in a case where the wavelength conversion element is used while it is controlled to be at a high temperature as described above, the wavelength conversion element 705 is heated abruptly particularly at the time of start-up. In a case where the wavelength conversion laser light source is used under these conditions, the optical absorptance within the wavelength conversion element readily increases. It is therefore particularly crucial to suppress an increase in the optical absorptance by the present embodiment.

Also, in the wavelength conversion laser light source 100 or 1100 of the present embodiment, in a case where the wavelength conversion laser light source is intermittently driven or pulse-driven, as are shown in FIG. 6A and FIG. 6B, when energy per period, which is found by integrating outputs in an intermittent portion 1401 or a pulse portion 1402 with respect to time, exceeds 0.015 J, the optical absorptance increases abruptly in the conventional structure. The effect as achieved from the structure of the present embodiment therefore becomes more noticeable. (Herein, modulation drive at a duty of less than 50% is referred to as the pulse drive and modulation drive at a duty of 50% or higher is referred to as intermittent drive.) The wavelength conversion laser light source 100 or 1100 is therefore provided with the control device 712 as controller for modulation-driving the semiconductor laser chip 701 forming the fundamental laser generator so as to control energy per period in the intermittent portion or the pulse portion of the fundamental laser light to exceed 0.015 J.

In the present embodiment, a bulk type is used as the solid-state laser crystal and the wavelength conversion element as has been described above. However, the solid-state laser crystal and the wavelength conversion element of the present embodiment are not limited to this type and a waveguide type can be used as well. In the case of the waveguide type, the light intensity within the wavelength conversion element increases in comparison with the bulk type. Hence, an amount of change of the wavelength conversion element temperature caused by the turning ON or OFF and modulation-drive of the laser light source increases, and an increase in the optical absorptance becomes larger than that in the bulk type. Also, in the case of the waveguide type, propagation rates of the fundamental laser light and a wavelength-converted laser light change when a temperature distribution is generated in a direction perpendicular to the propagation direction of the fundamental wave laser light due to optical absorption, which gives rise to a change of the phase matching conditions (phase matching temperature and phase matching wavelength). Accordingly, in a case where the waveguide type is used, because output deterioration becomes larger than that in the bulk type, a reduction of an increase in the optical absorptance, as the effect as achieved from the structure of the present embodiment, becomes more noticeable.

Also, in the intra-resonator wavelength conversion laser light source as is used in the present embodiment, light intensity of the fundamental laser light within the wavelength conversion element becomes high in comparison with a wavelength conversion laser light source of a fifth embodiment described below. Accordingly, when the thermal lens effect is increased by an increase in the optical absorptance, the beam quality of a wavelength-converted laser light to be emitted readily deteriorates. The effect as achieved by applying the structure of the present embodiment can be more appreciated.

While the present embodiment described a case where a fundamental laser light having a wavelength of 1064 nm is converted to a 532-nm wavelength-converted laser light, it should be appreciated that the invention is not limited to this case. More specifically, a problem of an increase in the optical absorptance caused by a temperature change of the wavelength conversion element is a common problem with wavelength conversion laser light sources using the wavelength conversion element. Hence, it goes without saying that it is possible to suppress output deterioration of the wavelength-converted laser light by exerting the suppressing effect on an increase in the optical absorptance in the wavelength conversion element in wavelength conversion laser light sources modified in various manners without deviating from the scope of the invention described in the present embodiment.

Also, the present embodiment has discussed a problem of an increase in the optical absorptance caused by a temperature change for an LN or LT ferroelectric crystal with the periodically poled structure and presents an improvement measure. It should be noted, however, that the same can be said with KTP. Also, because the refractive index of KTP is about the same as that of $YVO_4$, not only the configuration of FIG. 1 but also the configuration of FIG. 3 can be adapted.

Also, the present embodiment has discussed a problem of an increase in the optical absorptance caused by a temperature change for an LN or LT ferroelectric crystal with the periodically poled structure and presents an improvement measure. It should be noted, however, that the same can be said with KTP. Also, because the refractive index of KTP is about the same as that of $YVO_4$, not only the configuration of FIG. 1A but also the configuration of FIG. 3 can be adapted.

Second Embodiment

Another embodiment of the invention will be described in the following with reference to the drawings.

Because a wavelength conversion laser light source of the present embodiment has a basic structure which is in common with the wavelength conversion laser light source of the first embodiment above, a characteristic portion alone will be described. Members having the same structures and functions will be designated by the same reference numerals, and the descriptions thereof shall be omitted where appropriate.

Figure 5:
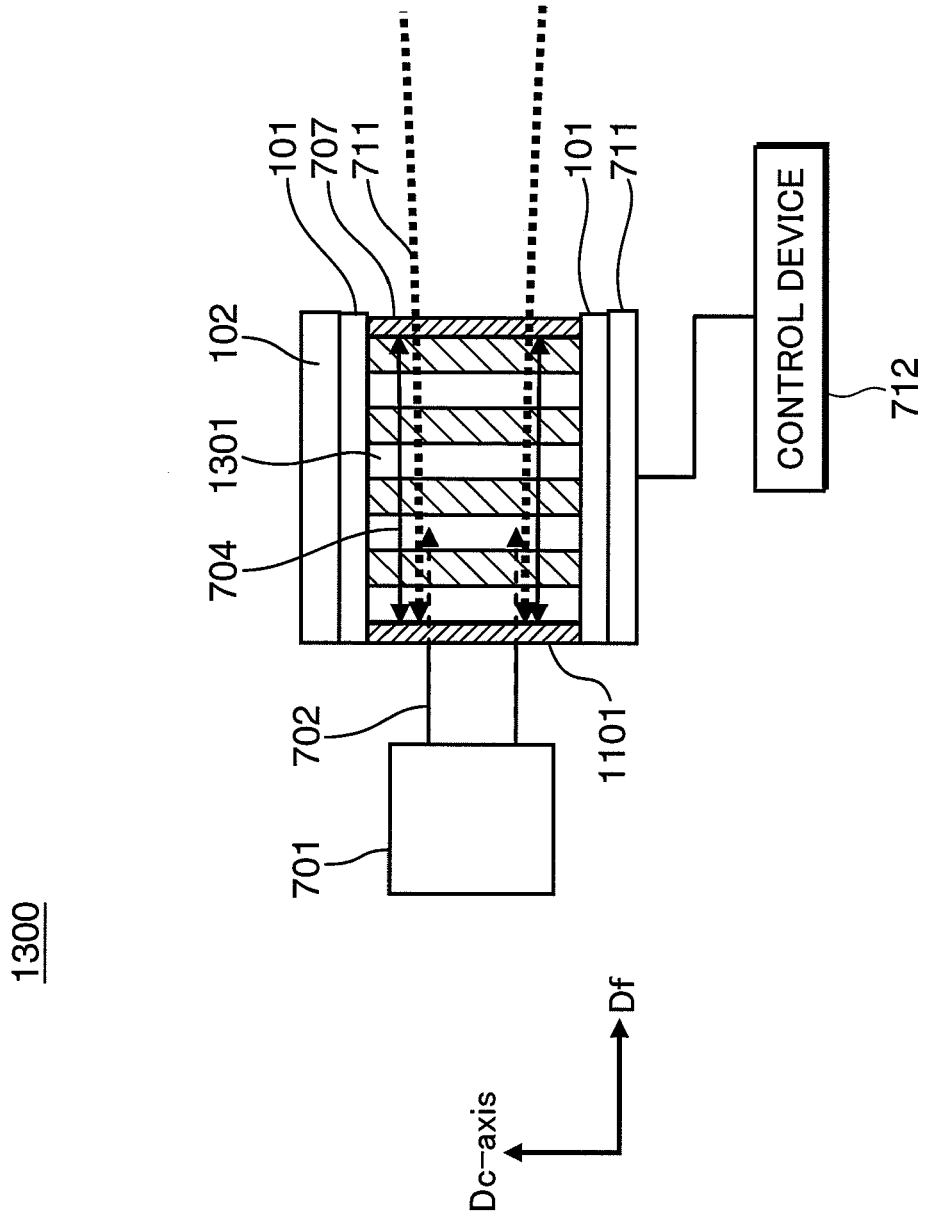
FIG. 5 is an explanatory view schematically showing one example of the wavelength conversion laser light source according to another embodiment of the invention.

FIG. 5 is an explanatory view schematically showing the structure of a wavelength conversion laser light source 1300 of the present embodiment. The wavelength conversion laser light source 1300 of the present embodiment is an intra-resonator green laser light source as with the counterpart of the first embodiment above.

The wavelength conversion laser light source 1300 does not include the solid-state laser crystal 703 in the wavelength conversion laser light source 100 (FIG. 1A) of the first embodiment above, and employs a wavelength conversion element 1301, which is an Nd- or Yb-added LN or LT with the periodically poled structure.

In FIG. 5, Dc-axis denotes the C-axis direction of the wavelength conversion element 1301 and Df denotes a propagation direction of the fundamental laser light 704.

The wavelength conversion laser light source 1300 is configured so that a pump laser light 702 (wavelength 808 nm) generated by the semiconductor laser chip (fundamental laser light source) 701 directly pumps Nd or Yb within the wavelength conversion element 1301 for generating a fundamental laser light having a wavelength of 1064 μm. A dielectric multi-layer 707 and a dielectric multi-layer 1101 formed on the respective both end faces of the wavelength conversion element 1301 and reflecting 1064-nm light serve as a resonator that oscillates a fundamental laser light 704 (wavelength of 1064 nm). The fundamental laser light 704 is wavelength-converted to a wavelength-converted laser light 710 (wavelength of 532 nm) within the wavelength conversion element 1301 and the wavelength-converted laser light 710 is emitted from the resonator.

For Nd- or Yb-added LN or LT used in the present embodiment, crystals can be grown by the Czochralski (CZ) method or the double cup insulator method. Crystals can be formed at lower costs by these crystal growth methods in comparison with a conventionally used solid-state laser crystals, such as $YVO_4$. Accordingly, the cost can be reduced markedly for the entire laser light source.

According to the structure of the present embodiment, however, a heat value generated within the wavelength conversion element 1301 is so large that the optical absorption over time associated with the turning ON or OFF of the modulation drive of the laser light source increases abruptly in comparison with the configurations of the first embodiment above shown in FIG. 1A and FIG. 4. Hence, the effect of applying the structure of the present embodiment to include the insulation layers 101 (the effect of suppressing output deterioration of the wavelength-converted laser light by exerting the suppressing effect on an increase in the optical absorptance in the wavelength conversion element) becomes more noticeable.

It is preferable to reduce a temperature change caused by heat generation within the wavelength conversion element 1301 to the minimum extent possible. A wavelength longer than 870 nm is more preferable as the wavelength of a pump laser light. In particular, in a case where Yb is added to the wavelength conversion element 1301, a wavelength longer than 910 nm is preferable as the wavelength of a pump laser light because heat generation within the wavelength conversion element 1301 becomes smaller, which makes it possible to suppress a temperature change within the wavelength conversion element 1301. By reducing a temperature change within the wavelength conversion element 1301, it becomes possible to suppress output deterioration by further suppressing an increase in the optical absorptance.

Third Embodiment

Still another embodiment of the invention will be described in the following with reference to the drawings.

Because the wavelength conversion laser light source of the present embodiment has a basic structure which is in common with the wavelength conversion laser light source of the first embodiment above, a characteristic portion alone will be described. Members of similar configurations are labeled with like reference numerals and descriptions of such members are omitted where appropriate.

As will be described below, a wavelength conversion laser light source of the present embodiment includes a wavelength conversion element capable of lessening a problem that occurs in a case where high-output wavelength conversion in a visible light region exceeding several W is performed.

A problem to be solved for a wavelength conversion element made of an LN or LT crystal is to prevent a phenomenon (photorefractive phenomenon) called optical damage caused by a change of the refractive index of the crystal by visible light at the time of wavelength conversion from infrared light to visible light. The optical damage means a photo-induced refractive index changing phenomenon by which a refractive index is changed in the periphery of a position at which a laser light passed by due to the electro-optic effect intrinsic to the crystal when electrons are excited by an optical electric field. It is known that the optical damage can be reduced by adding a required amount of metal, such as Mg, In, Zn, and Sc, to an LN crystal or an LT crystal.

For example, it is possible to suppress the optical damage by adding Mg of 5.0 mol % or more to LN of the congruent composition having an atom ratio of (Li) and (Li+Nb) expressed as: $0.460 \leq (Li)/(Li+Nb) \leq 0.486$.

In a case where high-output visible light in the order of W is generated, there is an increase in non-linear absorption, such as two-photon absorption of visible light and optical absorption induced by an interaction of visible light and infrared light. This poses problems, such as output instability, beam deterioration caused by the thermal lens, crystal breaking of the wavelength conversion element itself, and it becomes difficult to achieve a high output.

For example, in a case where an infrared laser light is irradiated to the wavelength conversion element (element length of 26 mm) made of LN added with Mg of 5.0 mol % from the outside and collected at the center of the wavelength conversion element to be incident on the wavelength conversion element with a beam waist diameter of about 60 μm, so that the incident infrared laser light is converted to a green laser light, which is a second-order harmonic of the incident beam, although it varies from element to element, crystal breaking of the wavelength conversion element generally starts to occur when an output power is in a range of 2.0 W to 2.5 W.

Such being the case, the inventors of the present application continued assiduous studies and discovered from the experiment result that the crystal resistance can be enhanced by adding Mg at a concentration at least 1.15 times higher than the least necessary concentration to suppress the optical damage.

In the following, the relation of the Mg addition concentration and the high-output resistance within an LN crystal made obvious from the experiment will be described.

LN crystals (wavelength conversion elements) of the congruent composition each having different Mg addition concentration were grown by the Czochralski method and the inventors of the present application made an evaluation of the crystal resistance on each crystal. For an evaluation of the crystal resistance, a resistance evaluation apparatus 1600 shown in FIG. 8 was used according to the condition in a case where an infrared fundamental laser light is converted to a green wavelength-converted laser light.

Figure 8:
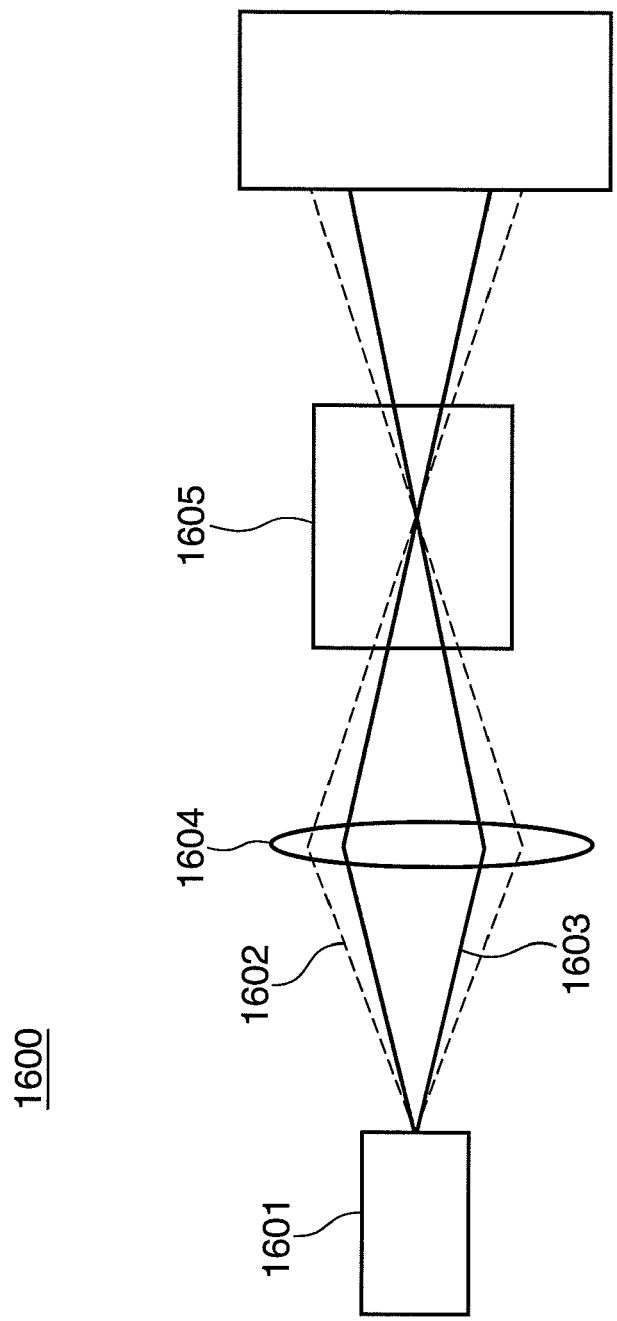
FIG. 8 is an explanatory view schematically showing the structure of a resistance evaluation apparatus that evaluates the crystal resistance of MgLN.

As is shown in FIG. 8, the resistance evaluation apparatus 1600 includes a two-wavelength integrated laser light source 1601 using a wavelength conversion element and an achromatizing lens 1604.

The two-wavelength integrated laser light source 1601 generates a two-wavelength integrated laser light of an infrared laser light 1602 and a green laser light 1603 having the coinciding optical axes. The achromatizing lens 1604 corresponds to infrared light and green light. The two-wavelength integrated laser light generated by the two-wavelength integrated laser light source 1601 is collected at the same point within a resistance evaluation sample 1605 by the achromatizing lens 1604. Herein, the collection spot (diameter) of the two-wavelength integrated laser light within the resistance evaluation sample 1605 is about 60 μm for an infrared laser light beam and about 40 μm for green light.

In this experiment, an output ratio of infrared light and green light was set to 3:1 and the crystal resistance was evaluated from a green output immediately before the occurrence of crystal breaking by gradually increasing an output.

The crystal resistance was evaluated using the resistance evaluation samples 1605, which were LN crystals of the congruent composition having (Li)/(Li+Nb) of about 0.482 and respectively having Mg mol concentrations of 4.6 mol %, 4.8 mol %, 5.0 mol %, 5.3 mol %, 5.6 mol %, 5.8 mol %, and 6.5 mol %. As has been already known, it was also confirmed in this experiment that the optical damage occurred in crystals having Mg addition concentration of less than 5.0 mol % while the occurrence of the optical damage was prevented in crystals having the concentration of 5.0 mol % or higher.

The evaluation result of crystals having the concentration of 5.0 mol % or higher and therefore least susceptible to the optical damage is set forth in FIG. 7. In the graph of FIG. 7, the ordinate is used for the crystal resistance normalized by a conventional LN crystal added with Mg of about 5.0 mol % and the abscissa is used for the Mg addition concentration (mol %).

As is shown in FIG. 7, it becomes obvious that the crystal resistance can be enhanced in a case where Mg is added at concentration of 5.75 mol % or more, which is 1.15 times higher than 5.0 mol % as the Mg addition amount necessary to eliminate the optical damage.

More specifically, when an infrared laser light is irradiated from the outside to a wavelength conversion element, which is an LN crystal of the congruent composition added with Mg of 5.75 mol % or more, which is 1.15 times higher than the Mg addition amount necessary to eliminate the optical damage, with the periodically poled structure, it becomes possible to generate green light of a power exceeding 2.5 W, which is conventionally difficult to obtain because of the occurrence of the crystal breaking.

A manufacturing method of the periodically poled structure will now be described with reference to FIG. 9. Initially, a periodic electrode 1703 and a plate electrode 1705 are formed, respectively, on a +C plane 1702 and a –C plane 1704 of an Mg-added MgLN substrate 1701. A thickness of the MgLN substrate 1701 from the +C plane to the –C plane is 1 mm, the length of the region forming the periodic electrode and the plate electrode in the period direction is 26 mm, and the period of the periodic electrode is 6.97 μm. An electric field is applied between the periodic electrode 1703 and the plate electrode 1705 using a pulse power supply 1706. The electric field is applied in an insulating liquid at about 100° C. and a voltage applied between the periodic electrode 1703 and the plate electrode 1705 is set to 3 kV. Periodically poled regions 1707 are formed beneath the periodic electrode 1703 by this electric field applying method. It thus becomes possible to adjust the period of the periodically poled structure as desired by adjusting the period of the periodic electrode 1703.

Figure 9:
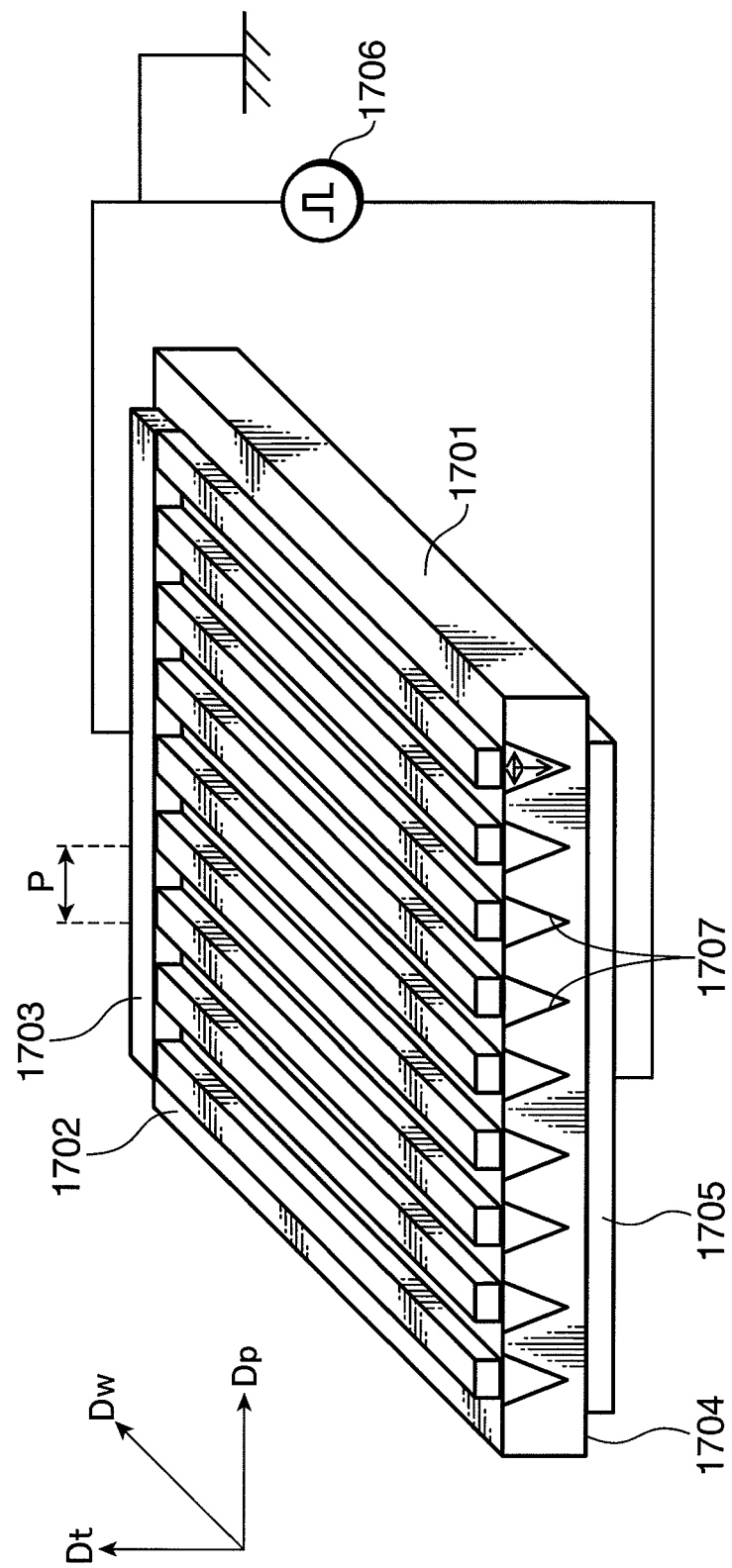
FIG. 9 is an explanatory view showing a manufacturing method of a periodically poled structure in the wavelength conversion element.

In FIG. 9, Dt denotes the thickness direction of the MgLN substrate 1701 and Dw denotes the width direction of the MgLN substrate 1701. Also, a capital P denotes the period of the periodically poled structure and Dp denotes the period direction of the periodically poled structure.

As an addition amount of Mg to be added to the LN crystal, it is more preferable to add Mg of 6.25 mol % or more, which is 1.25 times higher than the Mg addition amount necessary to eliminate the optical damage. In this case, green light in the order 3 W can be generated. It is further preferable to add Mg of 6.5 mol % or more, which is 1.3 times higher than the Mg addition amount necessary to eliminate the optical damage. In this case, green light in the order of 3.2 W can be generated.

The invention is configured to lessen crystal breaking caused by the interaction of infrared light and visible light. Hence, even in a case where a laser light having a wavelength, for example, of 2000 nm or shorter is allowed to go incident on the wavelength conversion element to generate light having a wavelength of 670 nm or shorter as a third-order harmonic, the invention exerts the effect because absorption of the second-order harmonic by the third-order harmonic can be lessened.

Further, the invention also exerts the effect in a case where a laser light having wavelength of 1300 nm or shorter is allowed to go incident on the wavelength conversion element to obtain a second-order harmonic, because absorption of the fundamental wave by the second-order harmonic can be lessened.

As the LN crystal, an LN crystal having (Li)/(Li+Nb) of 0.482 to 0.486 and Mg concentration is preferable. By using the LN crystal of this composition, the yield in the crystal growth using the Czochralski method can be enhanced, which makes it possible to achieve a more inexpensive wavelength conversion element. It thus becomes possible to reduce the manufacturing costs of the laser light source employing the wavelength conversion element.

In addition, the crystallinity is low on the light-incident surface and the light-output surface of the wavelength conversion element and crystal breaking readily occurs. To eliminate this inconvenience, it is preferable to design the optical system so that the beam diameter of infrared light on the light-incident surface and the light-output surface is 100 μm or larger. It is also preferable that the periodically poled structure is not formed in regions within 20 μm away from the light-incident surface and the light-output surface. In this case, spontaneous polarization in these regions within 20 μm away from the light-incident surface and the light-output surface is in a single direction. However, the polarization direction in the vicinity of the light-incident surface and the polarization direction in the vicinity of the light-output surface do not necessarily coincide with each other.

By using the wavelength conversion element of the present embodiment as the wavelength conversion element 705 or 1201 in the wavelength conversion laser light source of the first embodiment above, high-output wavelength conversion exceeding 2.5 W can be realized.

Fourth Embodiment

A still another embodiment of the invention will be described in the following with reference to the drawings.

Because a wavelength conversion laser light source of the present embodiment has a basic configuration which is in common with the wavelength conversion laser light source of the first embodiment above, a characteristic portion alone will be described. Members of similar configurations are labeled with like reference numerals and descriptions of such members are omitted where appropriate.

As will be described below, the wavelength conversion laser light source of the present embodiment includes a wavelength conversion element that achieves a high-efficient wavelength conversion laser light source. To be more concrete, it includes a wavelength conversion element capable of lessening a problem occurring in a case where a periodically poled structure as fine as several μm or smaller is formed in an MgLN crystal of the congruent composition grown by the Czochralski method.

In a case where a periodically poled structure is formed by inverting the spontaneous polarization of an MgLN crystal of the congruent composition grown by the Czochralski method with an electric field using a periodic electrode, it is difficult to form the periodically poled structure according to the electrode pattern. It is therefore difficult to form a fine poling pattern, which poses a problem that the yield deteriorates. In particular, it is difficult to form a periodically poled structure having a period length of about several μm, which is necessary for a wavelength conversion element that wavelength-converts light to visible light at a high efficiency.

In addition, because defects are not distributed uniformly in the crystal in an MgLN crystal of the congruent composition, the poling formation does not readily proceed at a point where the defect concentration is high. Further, because the spontaneous polarization inverts at a lower voltage in a portion where the Mg concentration within the crystal is higher, the poling formation proceeds more slowly in a portion where the Mg concentration is low. In other words, in a case where an MgLN crystal of the congruent composition is used, it is difficult to form periodically poled regions uniformly in a broad range because of irregularities of the defect concentration and the irregularities of the Mg concentration within the crystal.

As a conventional method of suppressing the spread of the periodically poled regions in the period direction, there is a method of shortening a voltage application time by applying a short-time pulse voltage having a pulse width as short as about 100 μs on the electrode.

Even in a case where this method is used, however, it is difficult to suppress the spread of the periodically poled regions in the period direction completely. It is therefore difficult to form a poling period of several μm like a short wavelength. In particular, in the case of LN of the congruent melting composition (congruent composition) added with MgO of 5 mol % or higher, the symmetrical property of the hysteresis curve (P-E curve) of a ferroelectric substance becomes poor because of a large internal electric field and the rising of the P-E curve is not steep but gentle in the vicinity of the coercive electric field. Hence, inversion of the spontaneous polarization is poorly controlled when an electric field in the opposite direction to the spontaneous polarization is applied from the outside.

Also, there is proposed a method of manufacturing a more desirable element by reducing the presence of nonstoichiometeric defects in the LN crystal using the double cup insulator method, so that non-uniform poling caused by concentration irregularities induced by Li defects is suppressed by approximating the crystal composition ratio to be stoichiometric. The crystal growth method of pulling out a crystal from a melt having Li concentration higher than that in the congruent melting composition using the double cup insulator method has a serious problem in terms of yield. In a case where the growing time of the double cup insulator method is long from several days to a week, a slight amount of a raw material evaporates from the melt surface maintained at a high temperature. Evaporation of the melt, heterogeneity of the composition ratio within the growth melt, and a temperature distribution within the cup in the process of growing give rise to heterogeneity of the congruent composition ratio [Li/(Li+Nb)] within a crystal. The resulting variance of the crystal composition makes it extremely difficult to allow crystals of the same characteristic to be grown at a high yield.

To eliminate this inconvenience, the inventors of the present application continued assiduous studies and discovered from the experiment result that mol concentration of Mg to be added to lithium niobate ($LiNbO_3$: LN) of the congruent composition (a ratio of [Li/(Li+Nb)] is 0.460 to 0.486: congruent melting composition) gives influences to the manufacture accuracy of the periodically poled structure.

The relation of mol concentration of Mg to be added and the manufacture accuracy of the periodically poled structure that is made obvious from the experiment will be described in the following.

MgLN crystals used as evaluation samples were LN crystals having Li/(Li+Nb) of 0.460 to 0.486 and Mg (mol %)= [Mg]/([Mg]+[Li2O]+[Nb2O5]) of 4.97 mol %, 5.00 mol %, 5.06 mol %, 5.13 mol %, 5.22 mol %, and 5.37 mol %, and the periodically poled structure was formed in each by the electric field applying method.

In this experiment, periodically poled $MgO:LiNbO_3$ (periodically poled $MgO:LiNbO_3:PPMgLN$) (hereafter, denoted as PPMgLN) that generates green light, which is a second-order harmonic, upon incidence of infrared light was fabricated and the poling accuracy was evaluated from the conversion efficiency of PPMgLN serving as the wavelength conversion element. The periodically poled structure of the wavelength conversion element was manufactured by the method same as the method of the third embodiment described above with reference to FIG. 9.

Herein, an MgLN crystal having Li/(Li+Nb) of 0.460 to 0.486 and Mg concentration of 6 mol % or lower can be grown using the Czochralski method, which is used as means for industrially mass producing LN crystals of large diameter. Hence, such MgLN crystals are preferable because inexpensive PPMgLN can be manufactured using such MgLN.

Further, an MgLN crystal having Li/(Li+Nb) of 0.482 to 0.486 and Mg concentration of 6 mol % or lower is more preferable because it can be pulled out at a high yield during the crystal growth using the Czochralski method.

The Mg addition concentration contained in the MgLN crystals was evaluated using an X-ray fluorescence spectrometer by pulverizing a part of a wafer same as PPMgLN with the periodically poled structure.

Figure 11:
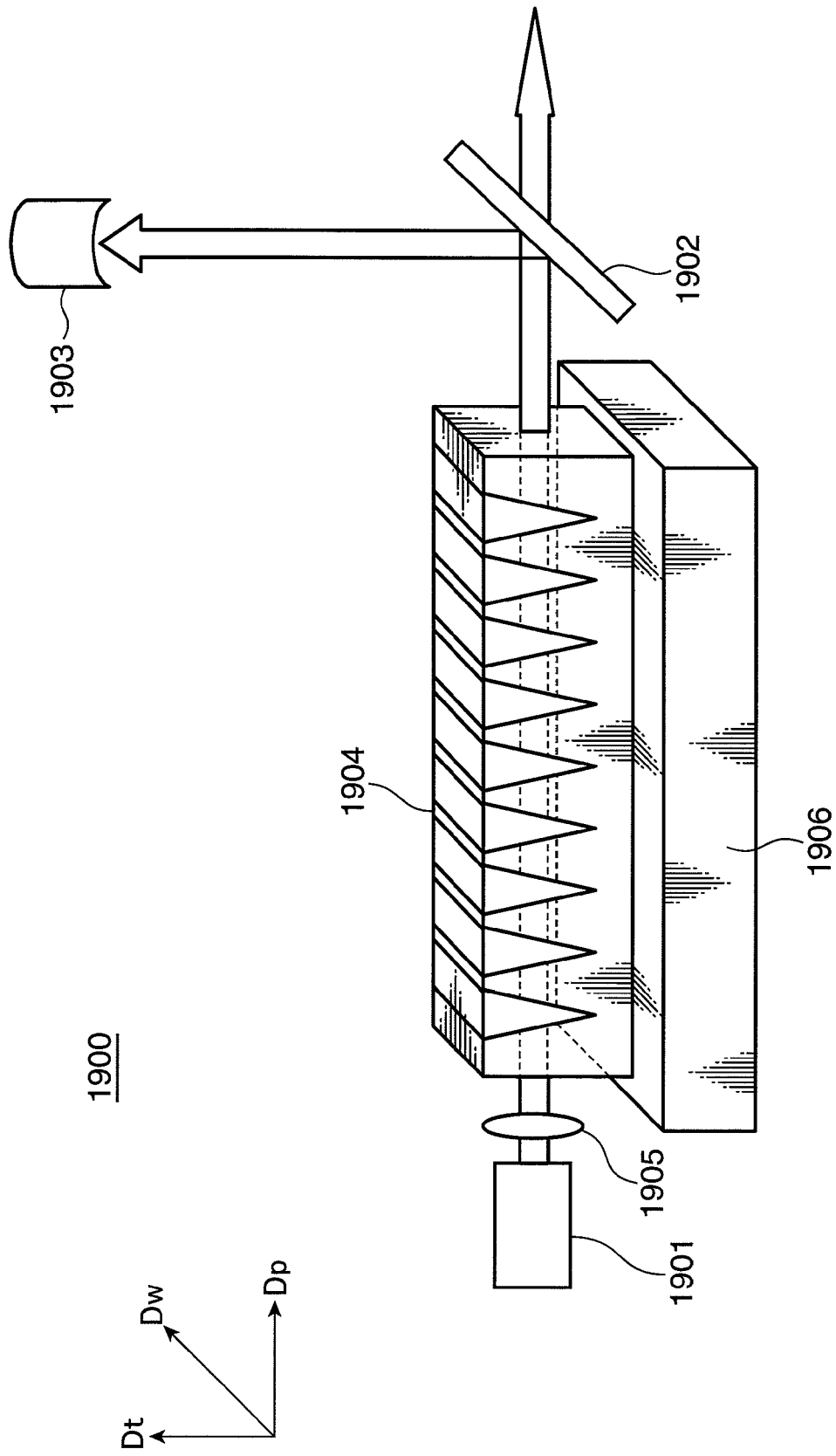
FIG. 11 is an explanatory view schematically showing the structure of an evaluation apparatus that evaluates conversion efficiency of the wavelength conversion element.

The wavelength conversion efficiency of the obtained PPMgLN was evaluated using a measurement instrument shown in FIG. 11. The evaluation method will be described in the following.

As is shown in FIG. 11, a measurement instrument 1900 includes a fiber laser device 1901, a light collecting lens 1905, a heater 1906, an optical isolation mirror 1902, and a photodiode 1903.

In FIG. 11, Dt denotes the thickness direction of PPMgLN 1904 and Dw denotes the width direction of the PPMgLN 1904. Also, Dp denotes the period direction of the periodically poled structure.

Initially, 1064-nm infrared light was generated using the fiber laser device 1901. This infrared light was then collected at the center portion within the PPMgLN 1904 using the light collecting lens 1905 so as to have the waist diameter of about 50 μm. In this instance, the infrared light was linearly polarized light and the polarizing direction and the polarization direction of the PPMgLN 1904 were brought into coincidence. Also, an output of the infrared light was about 250 mW and the infrared light was propagated in the period direction of the PPMgLN 1904. Part of the infrared light was converted to green light, which is a second-order harmonic, within the PPMgLN 1904. The PPMgLN 1904 was heated in the vicinity of 40° C. using the heater 1906. The green light generated within the PPMgLN 1904 and the infrared light that remained intact without being wavelength-converted went incident on the optical isolation mirror 1902. The optical isolation mirror 1902 then reflected the green light while transmitting the infrared light. The reflected green light went incident on the photodiode 1903. Herein, by adjusting the temperature of the PPMgLN 1904 and the position in the thickness direction of the PPMgLN 1904 at which the infrared light was to pass by, fine-adjustment was performed so as to achieve the maximum conversion efficiency from infrared light to green light.

The maximum value of a green light output obtained in this instance was divided by the square of an output of the incident infrared light to calculate a value (normalized conversion efficiency).

Figure 10:
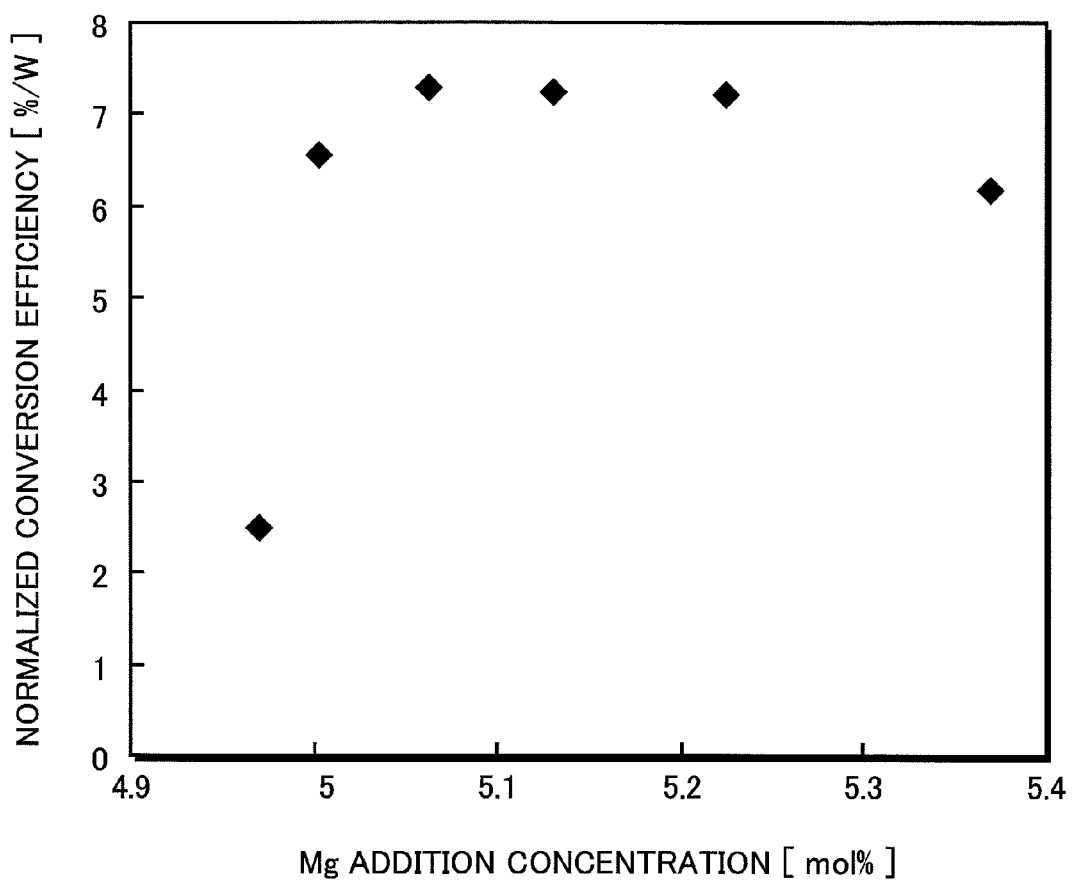
FIG. 10 is a graph showing a relation between mol concentration of Mg and normalized conversion efficiency in the wavelength conversion element made of MgLN.

As is shown in FIG. 10, it becomes obvious that a wavelength conversion element (PPMgLN) achieving high normalized conversion efficiency can be manufactured by forming the periodically poled structure in MgLN having Mg concentration in the range of 5.06 mol % to 5.37 mol % both inclusive.

It is preferable that the Mg concentration of MgLN is 5.22 mol % or lower. In this case, it becomes possible to achieve a wavelength conversion element with normalized conversion efficiency exceeding 7%/W. Herein, in the case of a wavelength conversion element, the conversion efficiency becomes higher as a discrepancy between the periodically poled regions and the electrode pattern becomes smaller. Hence, it can be said that the periodically poled structure almost according to the electrode pattern can be formed when the normalized conversion efficiency exceeds 7%/W.

In general, the resistance of crystal decreases with an increase in the Mg addition amount within the MgLN crystal, and it becomes difficult to control the poling, which makes it difficult to form a uniform periodically poled structure. However, when the Mg concentration increases from 5.00 mol % to a range of 5.06 mol % to 5.37 mol % both inclusive, Li defects within the crystal can be reduced, which consequently lessens irregularities in the poling formation. It thus becomes possible to prevent the resistance from decreasing due to local proceeding of the poling formation and the resistance of the crystal during application of an electric field increases on the contrary.

More specifically, it becomes obvious that when the Mg concentration within the MgLN crystal is set to the range specified above (from 5.06 mol % to 5.37 mol %), the resistance during application of an electric field becomes so high in comparison with the one added with Mg of 5.00 mol % or lower that a higher electric field can be applied to the substrate. In short, the poling can be formed at the highest voltage within the range specified in the invention. Uniform poling can be therefore formed in a broad range. Hence, even when the wavelength conversion element is large with a long length of 26 mm and a width of 10 mm, it can be manufactured as a high-efficient wavelength conversion element that achieves the normalized conversion efficiency exceeding 7%/W as in this invention. Accordingly, poling can be realized over a large area at a time, which makes it possible to significantly simplify the poling step in the element manufacturing process. It thus becomes possible to make a laser light source employing the wavelength conversion element more inexpensively by reducing the manufacturing costs of the wavelength conversion element.

In addition, by increasing the applied electric field, it becomes possible to form a deep and fine periodically poled structure by suppressing the poling formation in the period direction. In this case, it becomes possible to manufacture a wavelength conversion element with high normalized conversion efficiency. Moreover, it also becomes possible to form a uniform periodically poled structure at a deep position remote from the +C plane, which has been difficult to achieve in the conventional case. Further, it is discovered that PPMgLN having Mg concentration in a range of 5.06 mol % to 5.22 mol % both inclusive can achieve normalized conversion efficiency exceeding 7%/W even at a deep region of 500 μm or more away from the +C plane. This makes it possible to manufacture a larger bulk-type wavelength conversion element. Hence, the adjustment likelihood of the incident position of a fundamental laser light on the wavelength conversion element is increased. A more inexpensive laser light source can be thus achieved. Further, because an allowable range for displacement of the incident position is broadened, a laser light source resistant to vibrations and heat can be achieved.

According to the present embodiment, it is possible to form a fine, uniform periodically poled structure in MgLN. Hence, even in a case where an optical deflector of a fine prism shape or lens shape is manufactured, the accuracy can be enhanced.

The present embodiment has described the effect of manufacturing PPMgLN with a period of 6.97 μm. However, it goes without saying the same effect can be achieved when PPMgLN is manufactured with an arbitrary period.

The invention exerts the effect particularly when manufacturing PPMgLN with a period of 40 μm or shorter, at which it has been difficult to form a desirable periodically poled structure. In a case where PPMgLN with a period of 40 μm or shorter is disposed inside an optical parametric oscillator to oscillate near-infrared and mid-infrared laser light at high efficiency, long PPMgLN with the periodically poled portion exceeding 20 mm in the period direction is preferable. In the invention, uniform poling can be formed in a broad range, and the effect is enormous in the case of a long element exceeding 20 mm. In addition, in a case where wavelength conversion is performed by disposing PPMgLN inside the resonator in the configuration as is shown in FIG. 1A, conversion efficiency deteriorates due to a loss (absorption and scattering) inside the resonator. A bulk-type PPMgLN (non-waveguide type) causing a smaller incident loss and less scattering is therefore preferable. Adjustment becomes easier with the use of bulk-type PPMgLN. In particular, it is preferable that the cross section in the sectional direction perpendicular to the period direction of bulk-type PPMgLN exceeds 300 μm×300 μm. When configured in this manner, it becomes possible to prevent a loss of pump light on the light-incident end and the light-exiting end of the crystal, which in turn makes it possible to achieve a laser light source with a higher output. Further, the effect of the invention is particularly enormous in the case of manufacturing bulk-type PPMgLN for which it is necessary to form the poling deeply and uniformly.

The invention exerts the effect particularly when manufacturing PPMgLN with a period of 17 μm or shorter, at which it has been difficult to form a more desirable periodically poled structure.

The present embodiment can enhance the accuracy when forming the periodically poled structure in MgLN. Hence, beside it exerts an effect of enhancing conversion efficiency in an application as the wavelength conversion element as has been described above, it can be also used in an optical deflector utilizing the inversion structure of a prism shape or a lens shape.

Wavelength conversion at high efficiency can be realized by using the wavelength conversion element of the present embodiment as the wavelength conversion element 705 or 1201 in the wavelength conversion laser light source of the first embodiment above.

Fifth Embodiment

Still another embodiment of the present invention will be described in the following with reference to the drawings.

As a laser light source of the present embodiment, the wavelength conversion element described in the third embodiment or the fourth embodiment above may be used.

Figure 12:
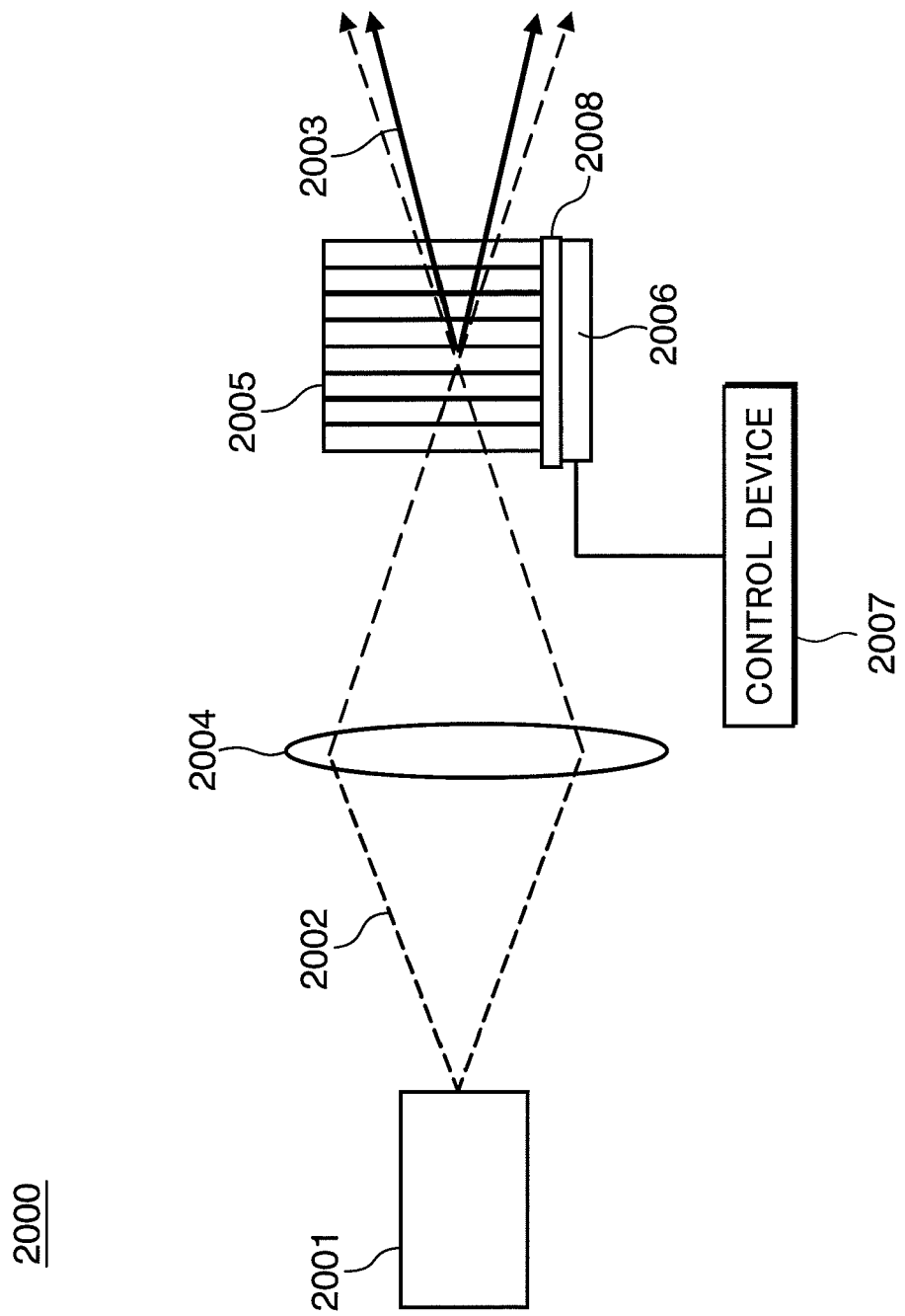
FIG. 12 is an explanatory view schematically showing one example of the wavelength conversion laser light source according to still another embodiment of the invention.

As is shown in FIG. 12, a wavelength conversion laser light source 2000 of the present embodiment includes a fundamental laser light source 2001, a light collecting lens 2004, a wavelength conversion element 2005, a holding member 2006, and a control device 2007.

The wavelength conversion laser light source 2000 generates a fundamental laser light 2002 using the fundamental laser light source 2001. It is configured in such a manner that the fundamental laser light 2002 is allowed to go incident on the wavelength conversion element 2005 via the light collecting lens 2004 so that it is converted to a wavelength-converted laser light 2003. A fiber laser is used as the fundamental laser light source 2001. The fundamental laser light 2002 is an infrared laser light having a wavelength of 1064 nm. The wavelength-converted laser light 2003 is a green laser light having a wavelength of 532 nm, which is a second-order harmonic of the fundamental laser light 2002. As the wavelength conversion element 2005, an LN or LT ferroelectric crystal with the periodically poled structure is used. In a case where the wavelength conversion element 2005 is essentially made of LN, a periodically poled structure with a period of about 7 µm is formed therein, and in a case where it is essentially made of LT, a periodically poled structure with a period of about 8 µm is formed therein.

The wavelength conversion element 2005 is fixed to the holding member 2006. The temperature of the wavelength conversion element 2005 is adjusted to satisfy the phase matching condition by the control device 2007 via the holding member 2006. According to the present embodiment, it is preferable to use an inexpensive material having high thermal conductivity as the holding member 2006 as in the case of the first embodiment. Also, for the same reason as in the first embodiment above, it is preferable to include an insulation layer 2008 between the wavelength conversion element 2005 and the holding member 2006. With this structure, it is possible to suppress an increase in the optical absorptance over time, which in turn makes it possible to suppress a decrease in output due to an increase in optical absorptance.

As in the present embodiment, it is preferable that the electric resistivity of the insulation layer 2008 is $1 \times 10^8$ $\Omega \cdot cm$ or higher. In this case, it becomes possible to reduce an increase in the optical absorptance in a portion covered with the insulation layer 2008 to 25% or less of the conventional case. Consequently, output deterioration of the wavelength conversion laser light source 2000 can be reduced to about 10% or less of the conventional case.

Also, it is more preferable that the electric resistivity of the insulation layer 2008 is $2 \times 10^{11}$ $\Omega \cdot cm$ or higher. In this case, it becomes possible to reduce an increase in the optical absorptance markedly in a portion covered with the insulation layer 2008. It thus becomes possible to substantially eliminate output deterioration of the wavelength conversion laser light source 2000.

The insulation layer 2008 can be formed, for example, by vapor deposition. Alternatively, an oxide film or a nitride film, such as SiN maybe used as the insulation layer 2008, so that it is formed by plasma CVD (Chemical Vapor Deposition). The same effect can be achieved in this case, too. Further, the same effect can be achieved in a case where ECR sputtering is employed as the deposition method of the insulation layer 2008 instead of plasma CVD, and the insulation layer formed by ECR sputtering is used.

Manufacturing methods, such as RF sputtering and DC sputtering, however, are not preferable because DC drift occurs due to impurities mixed at the time of film deposition and a satisfactory insulation effect cannot be achieved.

Also, in a case where the insulation layer 2008 is made of an insulating material having electric resistivity of $1 \times 10^8$ $\Omega \cdot cm$ or higher, it is preferable that the thickness of the insulation layer 2008 is 10000 angstroms or thicker. In a case where the insulation layer 2008 is made of an insulating material having electric resistivity of $2 \times 10^{11}$ $\Omega \cdot cm$ or higher, it is preferable that the thickness of the insulation layer 2008 is 4000 angstroms or thicker. This is because the effect of the present embodiment is reduced in a case where the electric resistivity of the insulation layer 2008 is below the range specified above.

As with the conventional structure, it is preferable to use inexpensive metal having high thermal conductivity as the holding member 2006. To be more concrete, it is preferable to use a holding member having a thickness of at least 50 µm and the thermal conductivity of 50 W/m/K or higher. In this case, it becomes possible to suppress deterioration of the conversion efficiency caused by a temperature distribution in the propagation direction of a fundamental laser light.

It is preferable that the insulation layer 2008 is formed so as to cover 75% or more of the installation surface of the holding member 2006 for holding thereon the wavelength conversion element 2005. In this case, it becomes possible to suppress deterioration of the conversion efficiency from fundamental waves to higher harmonics more effectively.

It is preferable that the thickness of the insulation layer 2008 is 150 µm or thinner and the thermal conductivity thereof is 2 W/m/K or higher. In this case, it becomes possible to more effectively suppress deterioration of the conversion efficiency from fundamental waves to higher harmonics.

In a case where a wavelength-converted laser light exceeding 1 W is to be generated, it is more preferable to use the holding member 2006 having a thickness of 50 µm or thicker and the thermal conductivity of 220 W/m/K or higher. In this case, it becomes possible to eliminate instability of an output of a wavelength-converted laser light caused by a change of the temperature distribution in the propagation direction of a fundamental laser light.

As the insulation layer 2008, it is preferable to use, for example, copper (thermal conductivity of about 400 W/(m·K)) and aluminum (thermal conductivity of about 240 W/(m·K)).

As the holding member 2006, an insulating material having high thermal conductivity, such as a graphite sheet, can be used. However, the electric resistivity of a graphite sheet is lower than $1 \times 10^8$ $\Omega \cdot cm$ and it is preferable to use a material having electric resistivity of at least $1 \times 10^8$ $\Omega \cdot cm$ and more preferably, $2 \times 10^{11}$ $\Omega \cdot cm$ or higher as the insulation layer 2008.

For the wavelength conversion laser light source 2000 of the present embodiment, it is preferable to provide a holding member made of a material having high thermal conductivity to the wavelength conversion element 2005 also on the surface opposing the holding member 2006. Owing to this configuration, higher heat dissipation can be achieved. It is also preferable to use inexpensive metal having high thermal conductivity as this holding member.

In addition, LiNbO$_3$ (lithium niobate: LN) or LiTaO$_3$ (lithium tantalate: LT) without the periodically poled structure has electric resistivity of 1×10$^{13}$ Ω·cm or higher. Accordingly, LN or LT without the periodically poled structure can be used as the insulation layer 2008.

Also, it is preferable that the wavelength conversion element 2005 and the insulation layer 2008 are made of the same material. In this case, because a difference of thermal expansion coefficients between the wavelength conversion element 2005 and the insulation layer 2008 is small, it becomes possible to prevent application of stress inducted by a temperature change on the two crystals, which are the wavelength conversion element 2005 and the insulation layer 2008 joined to each other. It thus becomes possible to prevent deterioration of the wavelength conversion efficiency caused by a stress-induced change of the refractive index.

In a case where an LN material is used as the wavelength conversion element 2005, it is preferable to use silicon having a thermal expansion coefficient close to that of LN as the holding member 2006. Owing to this configuration, the same effect as described above can be achieved. Further, because silicon has high thermal conductivity (about 140 W/m/K), when silicon is used as the holding member 2006, it becomes possible to also lessen problems, such as deterioration of conversion efficiency and instability caused by a temperature distribution in the propagation direction of a fundamental laser light.

According to the present embodiment, in the case where the wavelength conversion element 1201 is used, wherein the periodically poled regions do not reach either one of the surfaces for holding thereon the holding member, it is not necessary to provide a new insulation layer on the surface on which the polarization direction is constant as in the case of the first embodiment described above with reference to FIG. 4.

Further, as the insulation layer 2008 between the holding member 2006 and the wavelength conversion element 2005, an insulating adhesive agent may be used. It is preferable to use an insulating adhesive agent having electric resistivity of about 1×10$^8$ Ω·cm or higher as this adhesive agent and it is more preferable to use an insulating adhesive of 2×10$^{11}$ Ω·cm or higher. In this case, as has been described above, it becomes possible to effectively reduce output deterioration of wavelength-converted light of the wavelength conversion laser light source 100. Further, by using an insulating adhesive agent as the insulation layer 101, the wavelength conversion element 2005 can be protected and fixed at the same time. It thus becomes possible to reduce the manufacturing costs of the wavelength conversion laser light source.

In addition, the inventors of the present application also discovered from the experiment that the optical absorption over time increases abruptly when an angle at which the holding member 2006 crosses the C-axis of the wavelength conversion element 2005 falls within a range of 90°±30°. Hence, when this discovery is applied to the configuration as above, the effect of the wavelength conversion laser light source 2000 of the present embodiment becomes particularly noticeable.

Also, because more significant influences are given to an increase in the optical absorption, which is a problem to be solved by the invention, as the poling period becomes shorter, the effect of the invention becomes more significant. The invention is therefore particularly useful for a wavelength conversion element with a period of 20 μm or shorter.

In addition, more significant influences are given to an increase in the optical absorption, which is a problem to be solved by the invention, as the poling period becomes shorter. Hence, in a case where the wavelength conversion element 2005 configured to have a short poling period is employed, the effect of the wavelength conversion laser light source 2000 of the present embodiment becomes particularly noticeable. More specifically, the present embodiment is particularly effective for a wavelength conversion element having a poling period of 20 μm or shorter.

Sufficient wavelength conversion is not obtained by the wavelength conversion laser light source 2000 of the embodiment unless the wavelength conversion element 2005 longer than the wavelength conversion element 2005 described in the first embodiment above is used. To be more concrete, it is preferable to use LN having an element length of 10 mm or longer or LT having an element length of 15 mm or longer as the wavelength conversion element 2005. When configured in this manner, it becomes possible to achieve both the generation of green light in the order of several W and high-efficient wavelength conversion of 30% or higher required for use as a display. However, in a case where LN or LT is used as the wavelength conversion element 2005, it is necessary to control the temperature of the wavelength conversion element 2005 in a width of ±0.1° C. when the element lengths are 10 mm or longer and 12 mm or longer, respectively.

This poses a problem that an increase in heat generation caused by an increase in the optical absorptance deteriorates the temperature controllability of the crystal and the output stability is deteriorated.

By using the wavelength conversion element described in the third embodiment above as the wavelength conversion element 2005, it becomes possible to generate high-output green light of a power exceeding 2.5 W. Also, by using the wavelength conversion element described in the fourth embodiment above, it becomes possible to achieve a highly efficient wavelength conversion laser light source.

This poses a problem that an increase in heat generation caused by an increase in the optical absorptance deteriorates the temperature controllability of the crystal and the output stability is deteriorated.

By using the wavelength conversion element described in the third embodiment above as the wavelength conversion element 2005, it becomes possible to generate high-output green light of a power exceeding 2.5 W. Also, by using the wavelength conversion element described in the fourth embodiment above, it becomes possible to achieve a highly efficient wavelength conversion laser light source.

Sixth Embodiment

Figure 13:
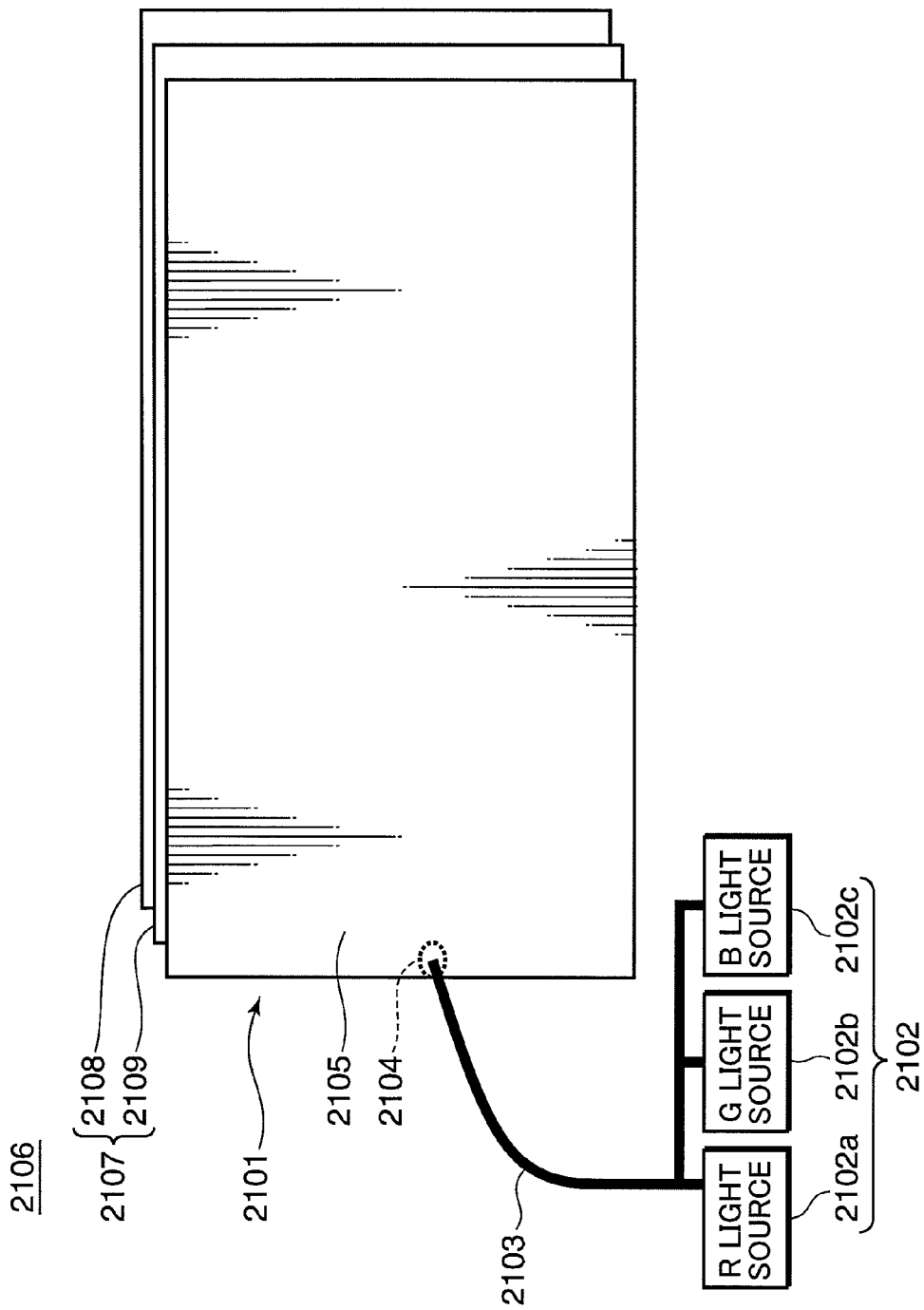
FIG. 13 is an explanatory view schematically showing one example of the structure of an image display apparatus according to still another embodiment of the invention.

FIG. 13 is a view schematically showing an example of the configuration of an image display apparatus according to a sixth embodiment of the invention using a backlight illumination device including the wavelength conversion laser light source described in the first, second or fifth embodiment above and configured to generate a green laser light. It schematically shows the configuration of a liquid crystal display 2106 as an example of such an image display apparatus.

As is shown in FIG. 13, the liquid crystal display 2106 includes a liquid crystal display panel 2107, which is a spatial modulation element, and a backlight illumination device 2101 that illuminates the liquid crystal display panel 2107 from behind. The light source of the backlight illumination device 2101 is formed of a plurality of laser lights sources 2102. The laser light sources 2102 are of a configuration using light sources respectively emitting at least red, green, and blue light. To be more specific, an R light source 2102a, a G light source 2102b, and a B light source 2102c emit red, green, and blue laser lights, respectively. Of these laser light sources 2102, the G light source 2102b is formed of a G light source formed of the wavelength conversion laser light source described in the first, second, or fifth embodiment of the invention above.

Herein, a semiconductor laser device made of an AlGaInP/GaAs material having a wavelength of 640 nm is used as the R light source 2102a, and a semiconductor laser device made of a GaN material having a wavelength of 450 nm is used as the blue laser light source (B light source) 2102c.

The structure of the liquid crystal display 2106 of the present embodiment will now be described schematically. The liquid crystal display 2106 of the present embodiment includes the backlight illumination device 2101 and the liquid crystal display panel 2107 that is formed of a polarization plate 2108 and a liquid crystal plate 2109 and displays an image thereon using laser lights of R light, G light, and B light emitted from the backlight illumination device 2101. In other words, as is shown in FIG. 13, the backlight illumination device 2101 of the present embodiment is formed of the laser light sources 2102, an optical fiber 2103 that combines laser lights of R light, G light, and B light from the corresponding laser light sources 2102 and guides these laser lights to a light guide plate 2105 via a light guide portion 2104, and the light guide plate 2105 that emits laser lights from the principal surface (not shown) uniformly filled with the laser lights of R light, G light, and B light that have been guided therein.

By using the laser light sources, it becomes possible to achieve a low power consuming image display apparatus achieving excellent color reproducibility.

Herein, the liquid crystal display using a transmissive liquid crystal panel as a spatial modulation element has been described as the image display apparatus using laser light sources. However, it goes without saying that the same effect can be achieved by an image display apparatus, such as a projector, using a DMD mirror and a reflective LCOS as the spatial modulation element.

In the case of a so-called laser scanning image display apparatus including laser light sources that generate R light, G light, and B light and a scanning mirror that scans a laser light two dimensionally, power consumption can be reduced further and a compact image display apparatus can be obtained.

By using the wavelength conversion laser light source described in the first or second embodiment above as a green laser light source in these image forming apparatuses, it becomes possible to achieve an image display apparatus with a longer life.

Seventh Embodiment

An example of a laser processing apparatus to which is applied any of the wavelength conversion elements described above will be described with reference to FIG. 14.

Figure 14:
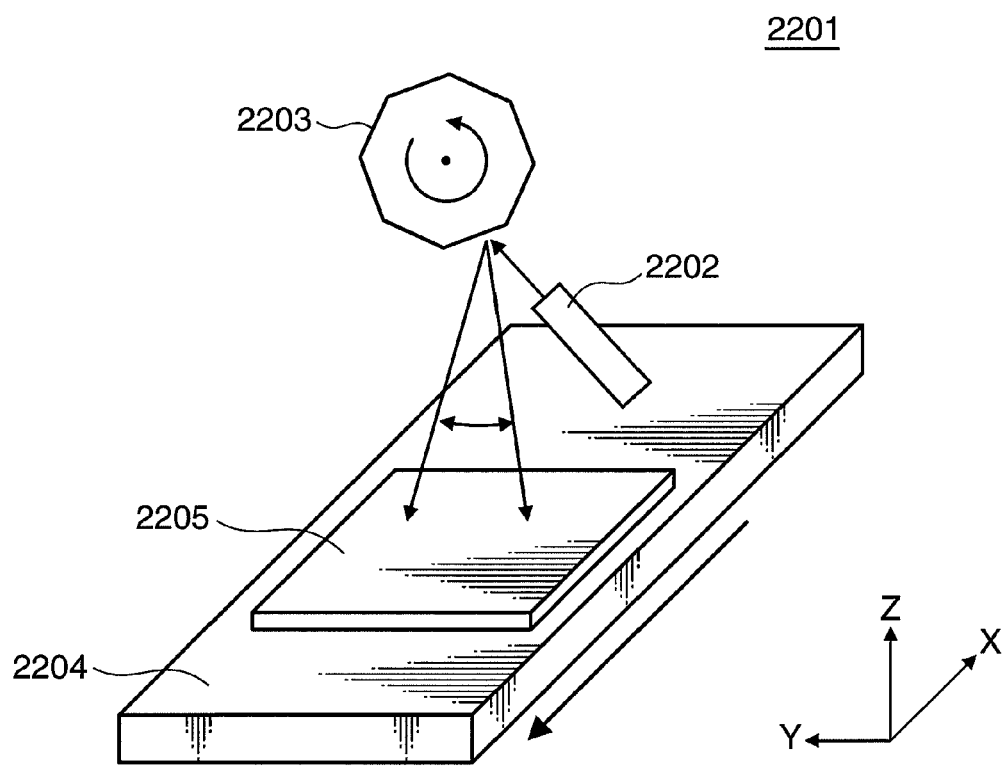
FIG. 14 is an explanatory view schematically showing one example of the structure of a laser processing apparatus according to still another embodiment of the invention.
Figure 15:
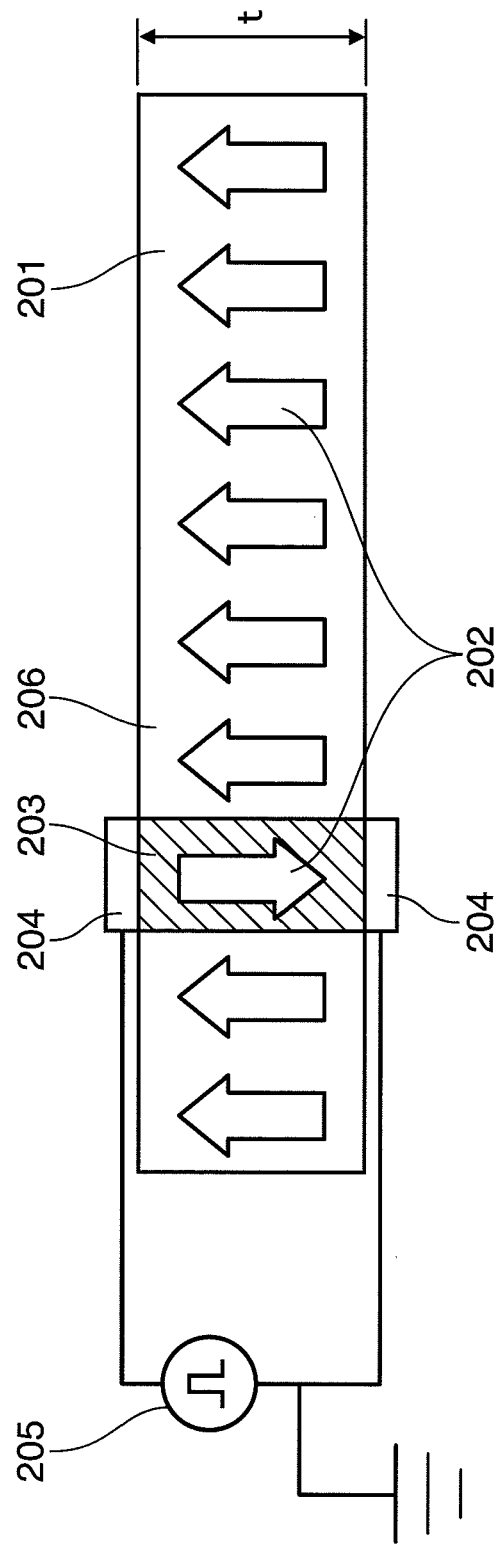
FIG. 15 is an explanatory view showing a manufacturing method of a periodically poled structure in a ferroelectric substance (ferroelectric crystal)

FIG. 14 is a view schematically showing an example of the configuration of a laser processing apparatus according to a seventh embodiment of the invention.

As is shown in FIG. 14, a laser processing apparatus 2201 includes a laser light source 2202, a scan mirror 2203, and a stage 2204. It processes a sample 2205.

As the wavelength conversion laser light source in the laser processing apparatus 2201, the wavelength conversion laser light source described in the fifth embodiment above is used. A laser light emitted from the laser light source 2202 is reflected on the scan mirror 2203 and irradiated on the sample 2205 placed on the stage 2204. The laser irradiation position on the sample 2205 is moved in the Y-axis direction in the drawing. By moving the stage 2204 on which is placed the sample 2205 in the X-axis direction at the same time, the laser irradiation position on the sample 2205 is moved in the X-axis direction. According to the configured as above, for example, by pulse-oscillating the laser light source 2202 at an arbitrary laser irradiation position, it becomes possible to perform marking of an arbitrary pattern on the surface of the sample 2205.

Also, by placing the sample 2205 in a water tank and by pulse-irradiating a laser light toward the surface of the sample 2205 in the same manner as above, the laser processing apparatus 2201 can be also applied to laser peening.

The laser light source of the invention is capable of generating a stable laser light with a high beam quality, and is therefore preferable as a light source employed in the laser processing apparatus for laser marking or laser peening.

For the laser peening, it is preferable to use a laser light source that generates, as wavelength-converted light, light having a wavelength in a range of 441 nm to 592 nm. In this case, even when there is water on the surface of the sample 2205 as an object to be processed, the wavelength-converted light is hardly absorbed in water. It thus becomes possible to exert a high laser peening effect on an irradiation surface of the object to be processed. By preventing water from evaporating as it absorbs a laser light, it becomes possible to exert a high laser peening effect on the irradiation surface of the sample 2205.

The present embodiment has described the laser scanning type processing apparatus using the scan mirror. It should be appreciated, however, that this is a mere example of the processing apparatus using a laser light source. For example, the processing apparatus may be configured in such a manner that a laser light generated in the laser light source is allowed to go incident on a fiber, so that the laser light is irradiated to an arbitrary irradiation surface to which the opposite surface (light-emitting end) of the fiber is facing. When configured in this manner, it becomes possible to achieve a laser processing apparatus for surgery, such as a treatment of the fundus of the eye.

In a case where wavelength-converted light generated through wavelength conversion is used by allowing it to go incident on a fiber, in order to reduce an insertion loss upon incident on the fiber, a laser light source with an excellent beam quality having $M^2$ (M square) of 1.4 or less is preferable. Hence, as in the invention, it becomes crucial to maintain a high beam quality by suppressing the thermal lens effect by suppressing an increase in the optical absorptance.

It goes without saying that configurations described in the embodiments herein are mere examples and various modifications are possible without deviating from the scope of the invention.

By using the laser light sources of the invention, it becomes possible to achieve a green laser light source while suppressing a decrease in output power over time, and such a laser light source is useful as a backlight in a liquid crystal TV, a projection TV, a projector, and so forth.

In order to achieve the above and other objects, a laser light source according to one aspect of the invention includes: a fundamental laser generator for generating a fundamental laser light; a wavelength conversion element having formed therein a periodically poled structure, for converting the fundamental laser light into a laser light having a different wavelength, said wavelength conversion element being made of a ferroelectric crystal; a holding member for holding at least a part of an element surface of said wavelength conversion element, said element surface crossing a polarization direction of the periodically poled structure; and an insulation layer provided between the holding member and the element surface, wherein the insulation layer has an electric resistivity of not less than $1\times10^8$ Ω·cm.

According to the foregoing structure, the insulation layer having electric resistivity of not less than $1\times10^8$ Ω·cm is formed on the element surface of the wavelength conversion element, in a direction of crossing the polarization direction of the periodically poled structure. With this structure, in a portion where the insulation layer is formed, a direct contact between the holding member and the element surface of the wavelength conversion element. In a case where spontaneous polarization within a ferroelectric crystal serving as the wavelength conversion element expands and contracts, charges are generated due to the voltage rise effect on the element surface of the wavelength conversion element in a portion where the holding member is not in direct contact. An electric field produced by the charges thus generated causes the polarization wall to generate setoff stress to suppress expansion and contraction of the spontaneous polarization. It thus becomes possible to suppress an increase in the optical absorptance over time within the wavelength conversion element, which in turn makes it possible to suppress output deterioration over time of a wavelength-converted laser light obtained through wavelength conversion by the wavelength conversion element.

With the foregoing structure, it is preferable that the insulation layer is formed in an area of not less than 75% of the portion of the element surface, that is held by the holding member.

According to the foregoing structure, a reduction in the wavelength conversion efficiency of the wavelength conversion element can be effectively suppressed.

With the foregoing structure, it is preferable that an angle formed between the polarization direction of the periodically poled structure and the element surface be set in a range of from 60° to 120°.

The inventors of the present application discovered that the optical absorption over time increased more abruptly under the angle conditions specified above. Hence, the effect of suppressing a reduction in output power of a wavelength-converted laser light over time can be appreciated particularly under the above angle range.

With the foregoing structure, it is preferable that the wavelength conversion element is a ferroelectric crystal mainly made of $LiNbO_3$ or $LiTaO_3$.

With the foregoing structure, it is preferable that the insulation layer is made of $LiNbO_3$ or $LiTaO_3$ without having formed therein a periodically poled structure; and the wavelength conversion element and the insulation layer are made of a same material.

According to the foregoing structure, $LiNbO_3$ (lithium niobate: LN) or $LiTaO_3$ (lithium tantalate: LT) without the periodically poled structure has electric resistivity of $1\times10^{13}$ Ω·cm or higher and sufficiently functions as the insulation layer. By using LN or LT without the periodically poled structure as the insulation layer and using the same material for the wavelength conversion element and the insulation layer, a difference in thermal expansion coefficient between the wavelength conversion element and the insulation layer can be made smaller. It therefore becomes possible to prevent the boundary of the wavelength conversion element and the insulation layer of the laminated structure from receiving large stress induced by changes in temperature. It thus becomes possible to suppress a reduction in the wavelength conversion efficiency caused by changes in refractive index.

With the foregoing structure, the insulation layer is deposited on the element surface by plasma chemical vapor deposition (CVD) or electron cyclotron resonance (ECR) sputtering.

By forming the insulation layer by plasma CVD or ECR sputtering as in the foregoing structure, it becomes possible to form a minute insulation layer having fewer impurities. Hence, in comparison with the case of adopting the insulation layer formed by RF sputtering or DC sputtering, the insulation layer has fewer impurities and no DC drift occurs in the insulation layer. It thus becomes possible to more effectively suppress an increase in optical absorption rate and a reduction in output power of the wavelength conversion element.

With the foregoing structure, it is preferable that metal be added to the wavelength conversion element.

According to the foregoing structure, an optical damage given on the wavelength conversion element can be reduced. Examples of metal to be added to the wavelength conversion element include but not limited to Mg, In, Zn, and Sc.

With the foregoing structure, it is preferable that the wavelength conversion element made of $LiNbO_3$ crystal of congruent composition added with Mg of not less than 5.75 mol %.

According to the foregoing structure, it is possible to improve the resistance of the crystal in the wavelength conversion element. It thus becomes possible to generate green light of a power exceeding 2.5 W, which has been conventionally difficult to realize due to crystal breaking.

With the foregoing structure, it is preferable that the wavelength conversion element is a $LiNbO_3$ crystal having an atom ratio of (Li) and (Li+Nb) expressed as $0.460 \leq (Li)/(Li+Nb) \leq 0.486$ and mol concentration of Mg to be added in a range of from 5.06 mol % to 5.37 mol %.

By forming the periodically poled structure with an application of an electric field to the wavelength conversion element having the foregoing structure (MgLN crystal of the congruent composition), it becomes possible to form a deep, uniform, and fine periodically poled structure in the wavelength conversion element. In particular, it becomes possible to form a periodically poled structure with a period of about several μm, which is necessary for a wavelength conversion element at high conversion efficiency, uniformly over a broad range.

With the foregoing structure, it is preferable that the holding member has a thermal conductivity of not less than 50 W/(m·K).

According to the foregoing structure, it becomes possible to effectively suppress a reduction in the wavelength conversion efficiency by suppressing variations in temperature distributions in the propagation direction of a fundamental laser light in the wavelength conversion element.

With the foregoing structure, it is preferable to further include a controller for modulation-driving the fundamental laser generator so as to control energy per period in one of an intermittent portion and a pulse portion of the fundamental laser light to exceed 0.015 J.

According to the foregoing structure, in a case where the fundamental laser generator is modulation-driven (intermittently driven or pulse-driven), when energy per period in an intermittent portion or a pulse portion of the fundamental laser light exceeds 0.015 J, the optical absorptance in the wavelength conversion element increases abruptly. Accordingly, the effect of providing the insulation layer (suppressing effect on deterioration of wavelength conversion efficiency) becomes more noticeable.

With the foregoing structure, it may be arranged such that the fundamental laser generator includes a pump laser light source for generating a pump laser light and a fundamental wave oscillator for oscillating the fundamental laser light as being pumped by the pump laser light; said laser light source further comprising: a pair of resonators including the fundamental wave oscillator; and the wavelength conversion element is provided between said pair of resonators.

In the configuration descried above, it is preferable that the fundamental laser generator includes a pump laser light source that generates a pump laser light; and Nd or Yb is added to the wavelength conversion element.

According to the foregoing structures, by adding Nd or Yb to the wavelength conversion element, the fundamental wave oscillator that is pumped by a pump laser light to oscillate a fundamental laser light can be omitted. It thus becomes possible to achieve a compact laser light source.

With the foregoing structure, it is preferable that the fundamental wave oscillator is a solid-state laser crystal added with one of Nd and Yb, and that the solid-state laser crystal and the wavelength conversion element are in contact with each other.

According to the foregoing structure, it is possible to achieve a compact laser light source.

With the foregoing structure, it is preferable that the wavelength conversion element has a phase matching temperature of not less than 150° C.

As has been described, in the configuration in which the solid-state laser crystal and the wavelength conversion element are in contact with each other, it is preferable to set the phase matching temperature of the wavelength conversion element to a high temperature as high as or higher than 150° C. as in the configuration described above in response to the solid-state laser crystal that reaches a high temperature during operations. Herein, it is necessary to heat or cool the wavelength conversion element from a temperature not in use (installation environment temperature) to a temperature in use (phase matching temperature) and vice versa each time the laser light source is turned ON or OFF. By designing the temperature in use (phase matching temperature) to a high temperature as high as or higher than 150° C., a large temperature change is entailed in the wavelength conversion element each time the laser light source is turned ON or OFF. As has been described, the optical absorptance increases more as a temperature change of the wavelength conversion element becomes larger. The effect of providing the insulation layer (suppressing effect on deterioration of wavelength conversion efficiency) therefore becomes more noticeable.

With the foregoing structure, it is preferable that the wavelength conversion element is one of a bulk type, a two-dimensional waveguide type, and a three-dimensional multi-mode waveguide type.

According to the foregoing structure, in contrast to a wavelength conversion laser light source of a single mode three-dimensional waveguide type that is independent of the thermal lens effect, it becomes possible to lessen localization of light intensity. It thus becomes possible to further reduce an increase in the optical absorptance.

An image display apparatus according to another aspect of the invention is an image display apparatus characterized by including at least a green laser light source, a spatial modulation element that spatially modulates a laser light of the laser light source, and an optical system that guides a laser light emitted from the laser light source to the spatial modulation element, and the green laser light source is the laser light source of any of the foregoing structures.

An image display apparatus according to still another aspect of the invention is an image display apparatus characterized by including at least a green laser light source, a scanning portion that scans a laser light of the laser light source, and an optical system that guides a laser light emitted from the laser light source to the scanning portion, and the green laser light source is the laser light source of any of the configurations described above.

According to the configurations of the respective image display apparatuses described above, green laser output light with high visibility can be obtained efficiently. It thus becomes possible to achieve a low power consuming image display apparatus with excellent color reproducibility.

A processing apparatus according to still another aspect of the invention is characterized by including: the laser light source of any of the configurations described above, and an optical system that guides a laser light emitted from the laser light source to an object to be processed.

According to the foregoing structure, because it becomes possible to obtain wavelength-converted light efficiently by suppressing deterioration with time of wavelength-converted light, it can be suitably used for a processing apparatus.

With the foregoing structure, it is preferable that the laser light emitted from the laser light source has a wavelength in a range of from 441 nm to 592 µm.

When the wavelength of a laser light emitted from the laser light source is in the range of from 441 nm to 592 nm, even in a case where water is present on the surface of an object to be processed, the laser light is hardly absorbed in water. It thus becomes possible to exert a high laser peening effect on the irradiation surface of the object to be processed.

In the laser light sources of the invention configured as described above, an increase in the optical absorptance with time within the wavelength conversion element can be suppressed. It thus becomes possible also to suppress output deterioration with time induced by such an increase.

This application is based on Japanese Patent Application No. 2008-086053 filed on Mar. 28, 2008, Japanese Patent Application No. 2008-096846 filed on Apr. 3, 2008, and Japanese Patent Application No. 2008-152588 filed on Jun. 11, 2008, the contents of which are hereby incorporated by reference.

It should be appreciated that specific embodiments and examples described in the column, Detailed Description of the Invention, are merely intended to clarify the technical contents of the invention. It is therefore understood that the invention is neither limited nor construed narrowly by these specific embodiments but may otherwise be variously embodied within the sprit and the scope of the following claims of the invention.

What is claimed is:

1. A laser light source, comprising:
a fundamental laser generator for generating a fundamental laser light;
a wavelength conversion element having formed therein a periodically poled structure, for converting the fundamental laser light into a laser light having a different wavelength, said wavelength conversion element being made of a ferroelectric crystal and said wavelength conversion element including an element surface crossing a polarization direction of the periodically poled structure;
a conductive holding member for holding at least a portion of said element surface of said wavelength conversion element; and
an insulation layer provided between said conductive holding member and said element surface,
wherein said conductive holding member has a thermal conductivity of not less than 50 W/(m·K), wherein the insulation layer has an electric resistivity of not less than $1\times10^8$ Ω·cm, and the thickness of said insulation layer is 150 µm or less, wherein said wavelength conversion element includes a light-exiting side from which the laser light is emitted and a light-incident side on which the fundamental laser light is incident, and wherein said insulation layer is formed in a broader range on said light-exiting side than on said light-incident side, such that said insulation layer (i) covers less than 100% of the portion of said element surface that is held by said conductive holding member and (ii) covers no less than 75% of the portion of said element surface that is held by said conductive holding member.

2. The laser light source according to claim 1, wherein an angle formed between the polarization direction of the periodically poled structure and said element surface is in a range from 60° to 120°.

3. The laser light source according to claim 1, wherein said wavelength conversion element is a ferroelectric crystal essentially made of $LiNbO_3$ or $LiTaO_3$.

4. The laser light source according to claim 1, wherein:
said insulation layer is made of $LiNbO_3$ or $LiTaO_3$ without having formed therein a periodically poled structure; and
said wavelength conversion element and said insulation layer are made of a same material.

5. The laser light source according to claim 1, wherein said insulation layer is deposited on said element surface by plasma Chemical Vapor Deposition or electron cyclotron resonance sputtering.

6. The laser light source according to claim 3, wherein metal is added to said wavelength conversion element.

7. The laser light source according to claim 6, wherein said wavelength conversion element is made of $LiNbO_3$ crystal of congruent composition added with Mg of not less than 5.75 mol %.

8. The laser light source according to claim 6, wherein said wavelength conversion element is a $LiNbO_3$ crystal having an atom ratio of (Li) and (Li+Nb) expressed as $0.460 \leq (Li)/(Li+Nb) \leq 0.486$ and mol concentration of Mg to be added in a range of from 5.06 mol % to 5.37 mol %.

9. The laser light source according to claim 1, wherein the thermal conductivity of said insulation layer is 2 W(m·K) or higher.

10. The laser light source according to claim 1, further comprising a controller for modulation-driving said fundamental laser generator so as to control energy per period in one of an intermittent portion and a pulse portion of the fundamental laser light to exceed 0.015 J.

11. The laser light source according to claim 1,
wherein said fundamental laser generator includes a pump laser light source for generating a pump laser light and a fundamental wave oscillator for oscillating the fundamental laser light as being pumped by the pump laser light;
wherein said laser light source further comprises a pair of resonators including said fundamental wave oscillator, and
wherein said wavelength conversion element is provided between said pair of resonators.

12. The laser light source according to claim 11,
wherein Nd or Yb is added to said fundamental wave oscillator.

13. The laser light source according to claim 12,
wherein said fundamental wave oscillator and said wavelength conversion element are in contact with each other.

14. The laser light source according to claim 13, wherein said wavelength conversion element has a phase matching temperature of not less than 150° C. or higher.

15. The laser light source according to claim 11, wherein said wavelength conversion element is one of a bulk type, a two-dimensional waveguide type, and a three-dimensional multi-mode waveguide type.

16. An image display apparatus, comprising:
at least a green laser light source;
a spatial modulation element for spatially modulating a laser light emitted from said green laser light source; and
an optical system for guiding the laser light emitted from said green laser light source to said spatial modulation element,
wherein said green laser light source is said laser light source of claim 1.

17. An image display apparatus including:
at least a green laser light source;
a scanning portion that scans a laser light emitted from said green laser light source; and
an optical system that guides the laser light emitted from said green laser light source to said scanning portion,
wherein said green laser light source is said laser light source set forth in claim 1.

18. A processing apparatus, comprising:
said laser light source of claim 1; and
an optical system for guiding the laser light emitted from said laser light source to an object to be processed.

19. The processing apparatus according to claim 18, wherein the laser light emitted from said laser light source has a wavelength in a range of from 441 nm to 592 nm.

20. A laser light source comprising:
a fundamental laser generator for generating a fundamental laser light;
a wavelength conversion element having formed therein a periodically poled structure, for converting the fundamental laser light into a laser light having a different wavelength, said wavelength conversion element being made of a ferroelectric crystal and said wavelength conversion element including an element surface crossing a polarization direction of the periodically poled structure;
a conductive holding member for holding at least a portion of said element surface of said wavelength conversion element; and
an insulation layer provided between said conductive holding member and said element surface,
wherein said fundamental laser generator includes a pump laser light source for generating a pump laser light and a fundamental wave oscillator for oscillating the fundamental laser light as being pumped by the pump laser light,
wherein said laser light source further comprises a pair of resonators including said fundamental wave oscillator,
wherein said wavelength conversion element is provided between said pair of resonators,
wherein Nd or Yb is added to said fundamental wave oscillator, which is in contact with said wavelength conversion element to form a contact surface between said fundamental wave oscillator and said wavelength conversion element,
wherein said insulation layer has an electric resistivity of not less than $1\times10^8$ Ω·cm and is formed near the contact surface more than away from the contact surface, wherein said wavelength conversion element includes a light-exiting side from which the laser light is emitted and a light-incident side on which the fundamental laser light is incident, and wherein said insulation layer is formed in a broader range on said light-exiting side than on said light-incident side, such that said insulation layer (i) covers less than 100% of the portion of said element surface that is held by said conductive holding member and (ii) covers no less than 75% of the portion of said element surface that is held by said conductive holding member.

* * * * *